United States Patent
Amrite et al.

(10) Patent No.: US 11,727,215 B2
(45) Date of Patent: Aug. 15, 2023

(54) SEARCHABLE DATA STRUCTURE FOR ELECTRONIC DOCUMENTS

(71) Applicant: SparkCognition, Inc., Austin, TX (US)

(72) Inventors: Jaidev Amrite, Austin, TX (US); Erik Skiles, Manor, TX (US); Jashmi Lagisetty, Katy, TX (US)

(73) Assignee: SPARKCOGNITION, INC., Austin, TX (US)

( * ) Notice: Subject to any disclaimer, the term of this patent is extended or adjusted under 35 U.S.C. 154(b) by 222 days.

(21) Appl. No.: 17/099,349

(22) Filed: Nov. 16, 2020

(65) Prior Publication Data

US 2022/0156463 A1 May 19, 2022

(51) Int. Cl.
*G06F 17/00* (2019.01)
*G06F 40/30* (2020.01)
*G06F 16/901* (2019.01)
*G06F 40/106* (2020.01)
*G06F 40/205* (2020.01)

(52) U.S. Cl.
CPC .......... *G06F 40/30* (2020.01); *G06F 16/9027* (2019.01); *G06F 40/106* (2020.01); *G06F 40/205* (2020.01)

(58) Field of Classification Search
CPC .. G06F 16/9027; G06F 40/30; G06F 16/2246; G06F 16/322
USPC .......................................... 704/9, 4; 715/239
See application file for complete search history.

(56) References Cited

U.S. PATENT DOCUMENTS

| | | | |
|---|---|---|---|
| 5,848,184 A * | 12/1998 | Taylor | G06V 30/414 715/204 |
| 5,960,383 A | 9/1999 | Fleischer | |
| 7,013,309 B2 | 3/2006 | Chakraborty et al. | |
| 8,977,953 B1 * | 3/2015 | Pierre | G06F 40/289 715/201 |
| 10,698,905 B2 | 6/2020 | Ali et al. | |
| 10,817,781 B2 | 10/2020 | Skiles et al. | |
| 10,853,580 B1 | 12/2020 | Amrite et al. | |

(Continued)

OTHER PUBLICATIONS

Choudhury, Scalable Algorithms for Scholarly Figure Mining and Semantics, ACE, 2016 (Year: 2016).*

(Continued)

*Primary Examiner* — Stephen S Hong
*Assistant Examiner* — Matthew J Ludwig
(74) *Attorney, Agent, or Firm* — Moore IP Law

(57) ABSTRACT

A method of generating a searchable representation of an electronic document includes obtaining an electronic document specifying a graphical layout of content items including text. The method also includes determining pixel data representing the graphical layout of the content items and providing input data based, at least in part, on the pixel data to a document parsing model. The document parsing model is trained to detect functional regions within the graphical layout based on the input data, assign boundaries to the functional regions based on the input data, and assign a category label to each functional region that is detected. The method also includes matching portions of the text to corresponding functional regions based on the boundaries assigned to the functional regions and locations associated with the portions of the text and storing data representing the content items, the functional regions, and the category labels in a searchable data structure.

31 Claims, 9 Drawing Sheets

(56) References Cited

U.S. PATENT DOCUMENTS

| | | | |
|---|---|---|---|
| 10,963,503 B2 | 3/2021 | Skiles et al. | |
| 11,048,933 B2* | 6/2021 | Singh | G06V 30/414 |
| 11,295,175 B1* | 4/2022 | Adeniran | G06K 9/6218 |
| 11,386,095 B2 | 7/2022 | Ali et al. | |
| 11,450,125 B2* | 9/2022 | Schäfer | G06F 18/217 |
| 2010/0312728 A1* | 12/2010 | Feng | G06F 16/954 |
| | | | 706/12 |
| 2012/0310868 A1* | 12/2012 | Martins | G06F 16/313 |
| | | | 706/12 |
| 2015/0026556 A1* | 1/2015 | Stadermann | G06F 40/183 |
| | | | 715/227 |
| 2015/0093021 A1 | 4/2015 | Xu et al. | |
| 2016/0055376 A1* | 2/2016 | Koduru | G06V 10/44 |
| | | | 382/176 |
| 2016/0078102 A1* | 3/2016 | Crouch | G06F 16/313 |
| | | | 707/722 |
| 2016/0104077 A1* | 4/2016 | Jackson, Jr. | G06N 7/005 |
| | | | 706/12 |
| 2017/0147540 A1* | 5/2017 | McCormick | G06F 40/194 |
| 2017/0329749 A1* | 11/2017 | Milward | G06F 40/166 |
| 2019/0065991 A1 | 2/2019 | Guggilla et al. | |
| 2019/0340240 A1* | 11/2019 | Duta | G06V 30/15 |
| 2020/0244249 A1* | 7/2020 | Shin | H03H 3/02 |
| 2020/0302114 A1* | 9/2020 | Allen | G06F 40/216 |
| 2021/0097058 A1 | 4/2021 | Skiles et al. | |
| 2021/0248420 A1* | 8/2021 | Zhong | G06F 16/355 |
| 2022/0004713 A1* | 1/2022 | Han | G06V 30/413 |
| 2022/0019735 A1* | 1/2022 | Shekhar | G06Q 10/10 |
| 2022/0237932 A1* | 7/2022 | Lu | G06V 30/148 |

OTHER PUBLICATIONS

Zhong, PubLayNet: largest data ever for document layout analysis, 2019 International Conference on Document Analysis and Recognition, published 2019 (Year: 2019).*

* cited by examiner

ABC Co.     2014 Annual Report to Shareholders

Electronic Document 124

Risks (cont.)

price of feedstocks. An international trend toward increased regulation of the industry makes the effects of these risks difficult to forecast.

Summary of Profits and Losses

(All values in millions of U.S. dollars)

|  | 2014 | 2013 | 2012 |
|---|---|---|---|
| Revenue | 1,578.0 | 1,352.5 | 1,362.2 |
| Cost of Goods Sold | 473.2 | 522.4 * | 408.7 |
| Gross Profit (Loss) | 1104.8 | 830.1 | 953.5 |
| Expenses | 1026.1 | 845.3 | 885.3 |
|     Advertising | 205.2 | 170.0 | 177.1 |
|     Payroll | 820.5 | 676.2 | 706.2 |
|     Other (incl. one-time chages) | 0.4 | 15.2 * | 2.1 |
| Net Income | 78.7 | (-16.1) | 68.2 |

\* Excess COGS and one-time charges due to manufaturing changes to new feedstock

- 7 -

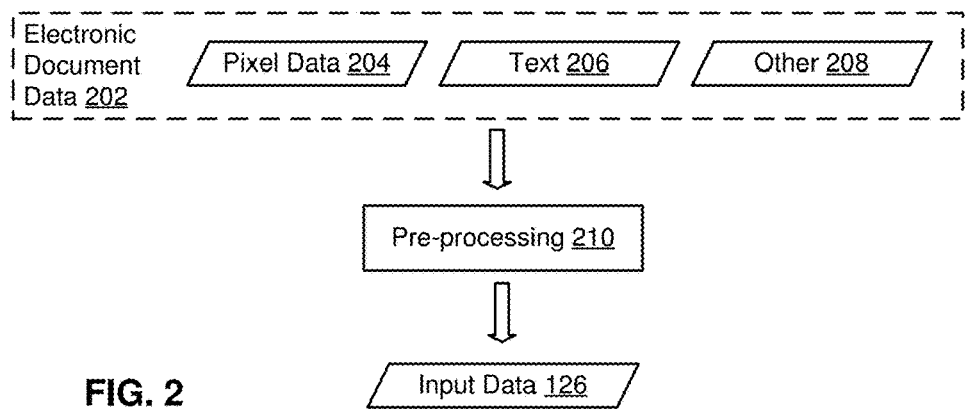

FIG. 2

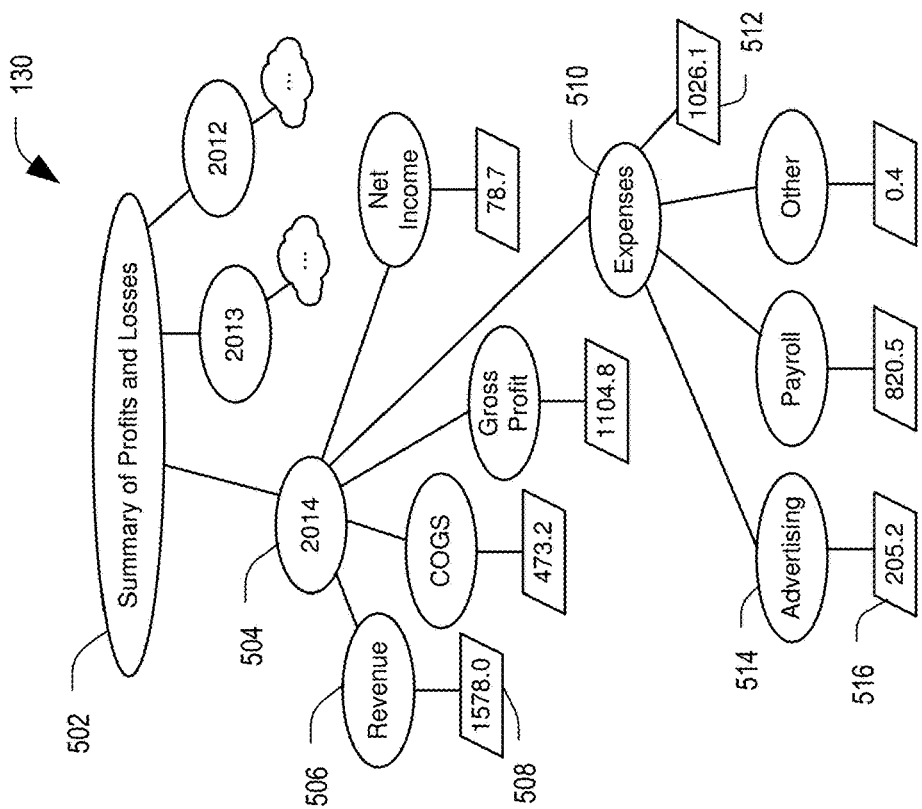

SEARCHABLE DATA STRUCTURE FOR ELECTRONIC DOCUMENTS

BACKGROUND

The increased use of computer systems and electronic communications has resulted in generation of and exchange of a large quantity of electronic documents. It is not uncommon for individuals and organizations to have access to so many electronic documents that the sheer quantity of information available can hamper efforts to retrieve specific information when it is desired.

Generally, document archives are searched using keywords. In some situations, keyword searches are not particularly well matched to the way people recognize and search for information. For example, keyword searches seek to match specific text within the electronic document. In contrast, humans extract a great deal of information from the format, layout, and context of the electronic document.

SUMMARY

To improve information retrieval, disclosed systems and methods generate searchable data structures to facilitate searching for information in a corpus of electronic documents. The searchable data structures are generated in a manner that captures text of the electronic documents and also captures context information based on a graphical layout of the electronic documents.

The searchable data structures have a smaller in-memory footprint than the corpus of electronic documents. Additionally, the searchable data structures facilitate information retrieval when the corpus of electronic documents includes structured or semi-structured content, such as tables. For example, it is common for businesses to periodically generate or updates certain business reports. For a particular company, a report during one period may have a similar, but not identical, format to the same report during a different period (e.g., due to changes in the business or operating environment). The searchable data structures facilitate searching such structured or semi-structured electronic documents by hierarchically arranging data in a manner that enables use of path-based searches to retrieve information from different reports. Additionally, a search engine associated with the searchable data structures can use the hierarchical arrangement of the searchable data structures to generate search heuristics that reduce search time, retrieve more relevant information, or both.

A particular aspect of the disclosure describes a method of generating a searchable representation of an electronic document. The method includes obtaining an electronic document specifying a graphical layout of content items, where the content items include at least text. The method also includes determining pixel data representing the graphical layout of the content items and providing input data based, at least in part, on the pixel data to a document parsing model. The document parsing model is trained to detect functional regions within the graphical layout based on the input data, assign boundaries to the functional regions based on the input data, and assign a category label to each functional region that is detected. The method also includes matching portions of the text to corresponding functional regions based on the boundaries assigned to the functional regions and locations associated with the portions of the text. The method further includes storing data representing the content items, the functional regions, and the category labels in a searchable data structure.

Another particular aspect of the disclosure describes a system including a memory storing instructions and a processor configured to execute the instructions to perform operations. The operations include obtaining an electronic document that includes data specifying a graphical layout of content items, where the content items include at least text. The operations also include determining pixel data representing the graphical layout of the content items and providing input data based, at least in part, on the pixel data to a document parsing model. The document parsing model is trained to detect functional regions within the graphical layout based on the input data, assign boundaries to the functional regions based on the input data, and assign a category label to each functional region that is detected. The operations also include matching portions of the text to corresponding functional regions based on the boundaries assigned to the functional regions and locations associated with the text. The operations further include storing a searchable data structure representing the content items, the functional regions, and the category labels.

Another particular aspect of the disclosure describes a non-transitory computer-readable medium storing instructions that are executable by a processor to cause the processor to perform operations. The operations include obtaining an electronic document that includes data specifying a graphical layout of content items, where the content items include at least text. The operations also include determining pixel data representing the graphical layout of the content items and providing input data based, at least in part, on the pixel data to a document parsing model. The document parsing model is trained to detect functional regions within the graphical layout based on the input data, assign boundaries to the functional regions based on the input data, and assign a category label to each functional region that is detected. The operations also include matching portions of the text to corresponding functional regions based on the boundaries assigned to the functional regions and locations associated with the text. The operations also include storing a searchable data structure representing the content items, the functional regions, and the category labels.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 2 is a diagram illustrating aspects of generation of a searchable data structure based on one or more electronic documents according to a particular implementation of FIG. 1.

FIG. 4 is a diagram illustrating aspects of generation of a searchable data structure based on one or more electronic documents according to a particular implementation of FIG. 1.

FIG. 5 is a diagram illustrating at least a portion of a searchable data structure according to a particular implementation of FIG. 1.

DETAILED DESCRIPTION

Figure 1:
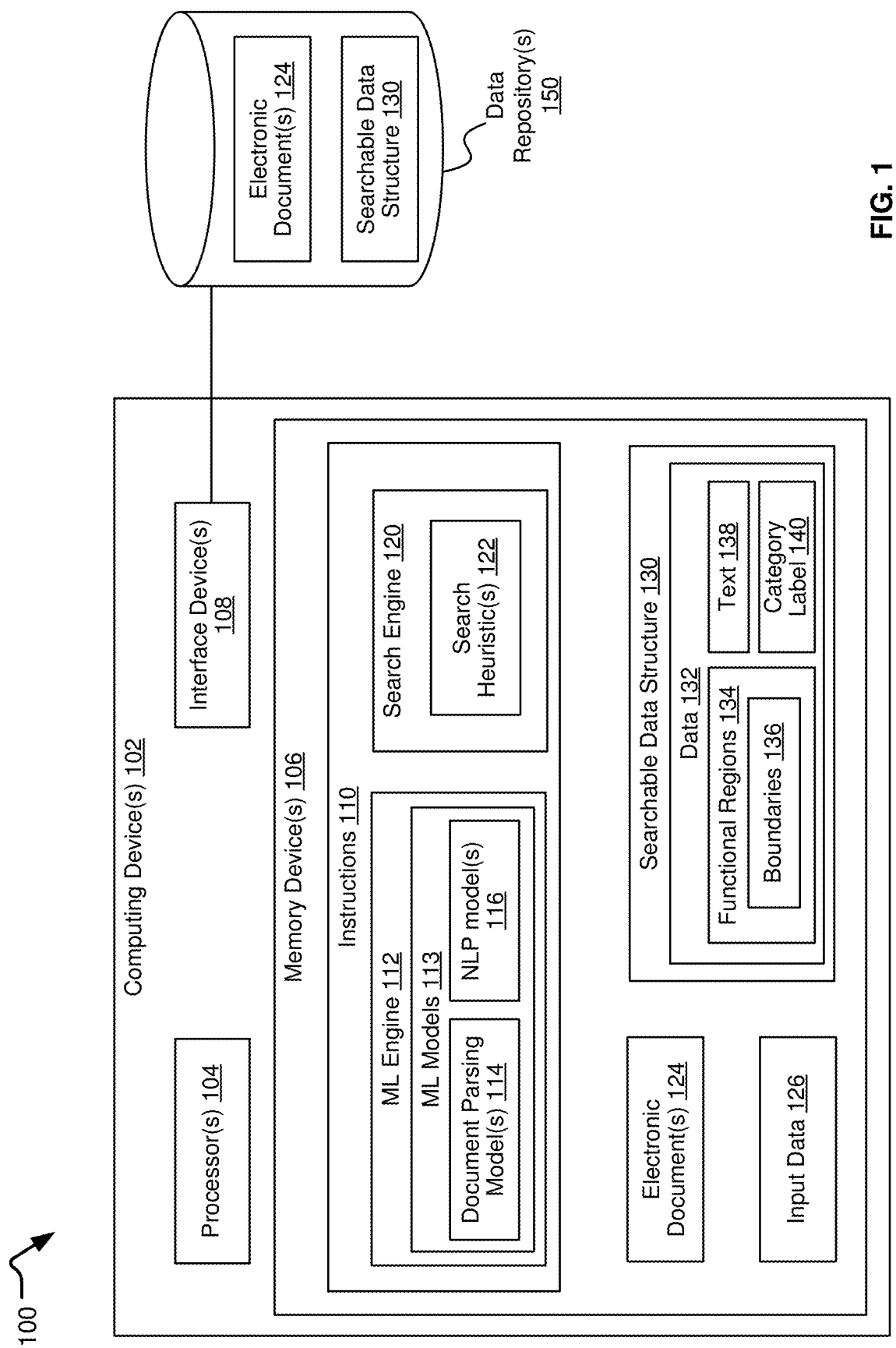
FIG. 1 is a block diagram of an example of a system configured to generate a searchable data structure based on one or more electronic documents.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 is a block diagram of an example of a system 100 configured to generate a searchable data structure 130 based on one or more electronic documents 124. The searchable data structure 130 is configured to facilitate knowledge retrieval from the electronic documents 124. For example, the electronic documents 124 may include a combination of unstructured text (e.g., prose), structured text (e.g., tables), and other content (referred to herein as "semi-structured") which is not clearly structured or unstructured (e.g., bullet point lists, tables that are not clearly delineated with gridlines, etc.). The system 100 is configured to generate the searchable data structure 130 such that information can be readily retrieved from any portion of the electronic documents, including unstructured text, structured text, and other content. One benefit of arranging information from the electronic documents 124 in the searchable data structure 130 is that search heuristics 122 can be generated to improve certain knowledge retrieval operations, as described further below.

The system 100 includes one or more computing devices 102. Each computing device 102 includes one or more processors 104, one or more interface devices 108, and one or more memory devices 106. In some examples, the computing device(s) 102 include one or more host computers, one or more servers, one or more workstations, one or more desktop computers, one or more laptop computers, one or more Internet of Things devices (e.g., a device with an embedded processing systems), one or more other computing devices, or combinations thereof.

The processor(s) 104 include one or more single-core or multi-core processing units, one or more digital signal processors (DSPs), one or more graphics processing units (GPUs), or any combination thereof. The processor(s) 104 are configured to access data and instructions 110 from the memory device(s) 106 and to perform various operations described further below. The processor(s) 104 are also coupled to the interface device(s) 108 to receive data from another device (such as receiving additional electronic documents 124 from a data repository 150), to send data to another device (such as sending a searchable data structure 130 or search query to the data repository 150 or sending a graphical user interface to a display device), or both.

The interface devices(s) 108 include one or more serial interfaces (e.g., universal serial bus (USB) interfaces or Ethernet interfaces), one or more parallel interfaces, one or more video or display adapters, one or more audio adapters, one or more other interfaces, or a combination thereof. The interface devices(s) 108 include a wired interface (e.g., Ethernet interfaces), a wireless interface, or both.

The memory device(s) 106 include tangible (i.e., non-transitory) computer-readable media, such as a magnetic or optical memory or a magnetic or optical disk/disc. For example, the memory device(s) 106 include volatile memory (e.g., volatile random access memory (RAM) devices), nonvolatile memory (e.g., read-only memory (ROM) devices, programmable read-only memory, or flash memory), one or more other memory devices, or a combination thereof.

The instructions 110 are executable by the processor(s) 104 to cause the processor(s) 104 to perform operations to generate the searchable data structure 130 based on the electronic document(s) 124, to retrieve data from the searchable data structure 130, or both. For example, in FIG. 1, the instructions 110 include a machine-learning (ML) engine 112 that is configured to execute one or more machine-learning models 113. The instructions 110 also include a search engine 120. In the example illustrated in FIG. 1, the machine-learning models 113 include one or more document parsing models 114 and one or more natural-language processing (NLP) models 116. In other examples, the machine-learning models 113 include additional models. Each of the machine-learning models 113 includes or corresponds to a trained model, such as a perceptron, a neural network, a support vector machine, a decision tree, a prototypical network for few-shot learning, an autoencoder, a random forest, a regression model, a Bayesian model, a naive Bayes model, a Boltzmann machine, deep belief networks, a convolutional neural network, another machine-learning model, or an ensemble, variant, or other combination thereof.

In some examples, the document parsing model(s) 114, the NLP model(s) 116, or both, includes two or more distinct models which cooperate to perform the operations described herein. For example, the document parsing model(s) 114 may include a first model that is trained to identify functional regions of an electronic document and a second model that is trained to identify subregions of a particular type of functional region. To illustrate, when the first model identifies a table in an electronic document 124, the second model may be used to identify parts of the table, such as rows, columns, data elements, headings, and so forth.

The memory device(s) 106, the data repository(s) 150, or both, store the electronic documents 124. Each electronic document 124 specifies a graphical layout of content items. The content items include, for example, text, graphics, pictures, etc. For certain types of electronic documents, such as portable document format (pdf) documents or image files (e.g., scanned documents), the content items and their graphical layout are represented by pixel data. In this context, "pixel data" refers to data that represents or specifies a plurality of display elements to render a display of the electronic document and each display element encodes at least one color bit representing a display color of the display element. As a simple example, the pixel data may include a set of data elements arranged such that each data element corresponds to a display pixel, and each data element includes a value of 1 to indicate that the corresponding pixel should be black or a value of 0 to indicate that the corresponding pixel should be white. Of course, many more complex representations of pixel data are commonly used, such as RGB data in which the color of each pixel is indicated by a red (R) value, a green (G) value, and a blue (B) value. Some pdf documents and many other types of documents also directly encode the text and graphical layout information. To illustrate, markup language documents, such as hypertext markup language (HTML) documents, may include text and as well as descriptors of layout information, such as font characteristics, spacing, colors, graphical elements (e.g., line, images, icons, etc.), and so forth.

The document parsing model(s) 114 are configured to receive input data 126 descriptive of one or more of the electronic document(s) 124 and to generate output data based on the input data 126. In a particular implementation, the document parsing model(s) 114 are trained to detect functional regions 134 within the graphical layout based on the input data 126, to assign boundaries 136 to the functional regions 134 based on the input data 126, and to assign a category label 140 to each functional region 134 that is detected. In this implementation, the output data from the document parsing model(s) 114 includes at least the category labels 140 and data descriptive of the boundaries 136 (e.g., pixel locations of corners or boundary regions). As used herein, a "functional region" refers to a portion of an electronic document that includes one or more content items and that is distinct from one or more other portions of the electric document in a manner that provides a contextual cue that the different portions include different types of content or are intended to convey different types of information. In particular implementations, the functional regions 134 are distinguished by context cues, such as text format (e.g., font size, font color, font position, other font characteristics, text alignment, or line spacing), position on a page, white space or blank regions on the page, background color, etc. To illustrate, one or more paragraphs of text with similar formatting may form a first functional region that is distinguished from a table by a changing in text format between text of the paragraphs and text of the table.

In some implementations, changes or differences in context cues between adjacent portions of the electronic document 124 indicate functional differences between the adjacent portions. To illustrate, a change in font characteristics, a change in character spacing, or a change in background color between two adjacent regions of the electronic document may indicate that the adjacent regions are distinct functional regions. Such differences can also be used to determine a category label associated with each of the adjacent functional regions. To illustrate, a first functional region, such as a paragraph of text, may have text of a first size, with first character spacing, first alignment, and first font characteristics (e.g., not bold); whereas, an adjacent second functional region, such as a section heading, may have text of a second size, with second character spacing, second alignment, and/or second font characteristics (e.g., bold).

When certain functional regions 134 are identified in an electronic document 124, these functional regions 134 may be further processed to identify and label sub-regions. For example, an electronic document 124 may include a table (with or without gridlines), and the graphical layout of content within the table may be evaluated to identify table headings, column headings, row headings, columns, rows, data elements, or other features. In a particular implementation, sub-regions of a table may be identified using computer vision based processes, such as based on gridlines, a grid-like arrangement of text or other structural characteristics. Additionally, or alternatively, sub-regions of a table may be identified based on typographic characteristics or patterns of typographic characteristics, such as background color, text color, spacing (e.g., between characters, words, or lines), fonts, special characters (e.g., colons, slashes, commas, semicolons, dashes, or other text delimiters). Additionally, or alternatively, sub-regions of a table may be identified based on semantic characteristics of text of the table. For example, if several words on a page are approximately aligned vertically (e.g., along a length of the page), and the words belong to the same semantic group (e.g., each is the name of a food item), then the set of words may be identified as a column.

In some implementations, when a functional region 134 is labeled as a table, the document parsing model(s) 114 perform operations to process individual data elements, columns, or rows of the table. For example, for a particular functional region 134 labeled as a table, the document parsing model(s) 114 may estimate column boundaries and row boundaries based on the input data associated with the particular functional region. In this example, the document parsing model(s) 114 may also determine whether one or more columns of the table have a column heading. If a column has a column heading, the document parsing model(s) 114 determine text of the column heading based on the text associated within the particular functional region 134. The document parsing model(s) 114 store at least a portion of the text associated with the particular functional region in a first data element of the searchable data structure 130 and stores the column heading of the column in a second data element, where the first data element is subordinate to the second data element in the searchable data structure 130. To illustrate, the column heading may be stored in a branch node of a tree structure and text of a cell of the table that is in the column may be stored in a leaf node coupled to the branch node. In some implementations, the document parsing model(s) 114 identify a column heading based on output of the NLP model(s) 116. For example, some tables may not include explicit column headings. Rather, column headings may implied by the content of the cells of the column or other portions of the table (e.g., a table heading). To illustrate, a table listing expenses may include data such as "Rent", "Payroll", "Advertising", "Taxes", which, in context, a human reader would recognize as expense categories without an "Expense" heading being provided. To determine an implied column heading of a particular column, the NLP model(s) 116 may analyze text of the table, such as text of a table head, text in cells, etc., to identify a semantic group represented by text of the column. In such implementations, the semantic group is assigned as the column heading.

As described further below, in some implementations, the document parsing model(s) 114 are trained using a supervised learning technique. For example, a set of electronic documents in which various functional regions have been annotated are used as supervised training data to train the document parsing model(s) 114. The annotations associated with the set of electronic documents may indicate boundaries of the various functional regions and a category label associated with each. The category labels 140 indicate the function (e.g., the syntactical or structural purpose) of content within each functional region 134. Examples of category labels 140 include page headers, page footers, section headings, paragraphs, tables, images, footnotes, and lists.

The document parsing model(s) 114 designate the functional regions 134, assign category labels 140 to the functional regions 134, or both, based on a probabilistic analysis of the pixel data associated with the electronic document 124. In some implementations, the document parsing model(s) 114 may also apply one or more rules or heuristics to assign the category labels 140. For example, when the text 138 of a functional region 134 includes one or more special characters, the document parsing model(s) 114 may assign a particular category label 140 to the functional region 134 (or may perform operations to indicate an increased probability that the functional region 134 is associated with the particular category label 140). To illustrate, when the first character of each line of the text 138 of a functional region 134 includes a bullet point character, the document parsing model(s) 114 determine a high probability that the functional region 134 corresponds to a list. The high probability can be determined by assigning a default probability value (e.g., 1) or by weighting output of the probabilistic analysis of the document parsing model(s) 114 to increase the probability associated with the list category label. In some implementations, a rule can also, or in the alternative, be used to decrease the probability that a particular category label is assigned to a functional region 134. To illustrate, a rule may indicate that text 138 with a large font size (e.g., greater than an average font size for the electronic document), a bold font, and a centered alignment has a low probability of being assigned a footnote category label.

In some implementations, the document parsing model(s) 114 assign a category label 140 to a functional region 134 based in part on output from the NLP model(s) 116. For example, the NLP model(s) 116 can be executed to perform a semantic analysis of the text 138 of the functional region 134. In this example, the output of the NLP model(s) 116 may indicate that the text 138 of the functional region 134 includes a particular type of information, such as a citation, boilerplate language, a phone number, etc. In this example, the output of the NLP model(s) 116 is provided as input (along with other information) to the document parsing model(s) 114, and the document parsing model(s) 114 use the output of the NLP model(s) 116 to determine the category label 140 assigned to the functional region 134. To illustrate, a functional region 134 that includes a citation and is located at the bottom of a page may be assigned the category label footnote based on the semantic content of the functional region 134 and the graphical layout of the page.

After the document parsing model(s) 114 identify the functional regions 134 within a particular electronic document 124, the processor(s) 104 match portions of the text 138 of the particular electronic document 124 to corresponding functional regions 134 based on the boundaries 136 assigned to the functional regions 134 and locations associated with the text 138. To illustrate, text 138 of the electronic document 124 that is disposed (in the graphical layout) within boundaries 136 of a first functional region is assigned to the first functional region. Thus, each functional region 134 of an electronic document 124 is associated with text 138 (or other content items), boundaries 136, and a category label 140.

In some implementations, the processor(s) 104 determine a topology of the searchable data structure 130 based on the text 138 (or other content items), the boundaries 136, the category labels 140, or a combination thereof, associated with the functional regions 134. In this context, the "topology" of the searchable data structure 130 refers to the number, type, and arrangement of data elements (e.g., nodes) and interconnections between data elements. For example, in a particular implementation, the searchable data structure 130 has a hierarchical topology, such as a tree or graph structure, in which certain data elements are linked in an ordered arrangement with other data elements. In this example, the order of the hierarchy of the topology of the searchable data structure 130 is determined based on the arrangement of information in the electronic document(s) 124. As a particular example, the searchable data structure 130 may include a tree structure having a plurality of leaf nodes. In this example, each leaf node is associated with a corresponding branch node, and the content items of the electronic document(s) 124 are assigned to nodes of the tree structure such that a hierarchy of the functional regions 134 is represented in the tree structure. Thus, the searchable data structure 130 is a knowledge representation based on the electronic document(s) 124 rather than, for example, a template.

As one example, a structured electronic document 124 may include text 138 related to different topics. The various topics may be indicated by section headings, and a section heading may precede text associated with a particular topic indicated by the section heading. In this example, the topology of the searchable data structure 130 is determined based on which category labels 140 are assigned to the functional regions 134 of the electronic document 124 and the graphical layout of the functional regions 134. For example, if the document parsing model(s) 114 assign a section heading category label to a first functional region and assign a paragraph category label to a second functional region 134 that is adjacent to and following the first functional region, the topology of the searchable data structure 130 is arranged such that data associated with the first functional region is linked to and hierarchically superior to the data associated with the second function region.

The processor(s) 104 store data 132 of the searchable data structure 130 based on the content items (e.g., the text 138 or other content items), the functional regions 134, and the category labels 140. For example, after the topology of the searchable data structure 130 is determined, the functional regions 134 are identified, and the category labels 140 of the functional regions 134 are assigned, each functional region 134 can be mapped to one or more nodes (also referred to herein as data elements) of the searchable data structure 130. Contents items, such as text, images, graphics, etc., associated with a particular functional region are stored in the node of the searchable data structure 130 that is mapped to the particular functional region. The searchable data structure 130 thus encodes knowledge representation derived from the graphical layout of the electronic documents 124 without retaining the detailed graphical layout itself. As a result, the searchable data structure 130 has a smaller in-memory footprint than the electronic document 124 but retains information explicitly and implicitly represented in the electronic document 124.

In the example of FIG. 1, the system 100 also includes a search engine 120. The search engine 120 includes instructions that are executable by the processor(s) 104 to find and retrieve information from the searchable data structure 130 (or from the electronic document(s) 124 based on information within the searchable data structure 130). The search engine 120 is also configured to generate and/or use one or more search heuristics 122 to improve information retrieval. For example, the search heuristic(s) 122 may be used to augment a search query received from a user.

As one example, a business may periodically generate or receive documents that follow a similar graphical layout. To illustrate, an annual report to shareholders from a particular company may have a similar, but not necessarily identical, graphical layout from year to year. In a particular implementation, the search heuristic(s) 122 can describe a data path (e.g., a set of node and links, or key value pair(s)) indicating a path in the searchable data structure 130 to retrieve particular information for a particular type of electronic document.

The search heuristic(s) 122 are generated after the topology of the searchable data structure 130 is determined. For example, the one or more of the search heuristic(s) 122 may be generated responsive to an indication that data associated with a particular search (e.g., a set of search terms of a search query) was obtained from the searchable data structure 130 via a particular data path. In this example, information descriptive of at least a portion of the data path and information descriptive of the search query may be used to generate a rule that is added to the search heuristic(s) 122.

In this example, the rule can be used to access similar data derived from other electronic documents. For example, a rule based on a query to identify Cost of Goods in the annual report for a first year can be used to identify Cost of Goods in annual reports for other years by searching the same data path in portions of the searchable data structure 130 associated with the other years.

The searchable data structure 130 has a smaller in-memory footprint than the electronic document(s) 124 it is based on. Additionally, the searchable data structure 130 facilitates information retrieval. For example, the searchable data structure 130 may store information from the electronic document(s) 124 in a hierarchical and/or interconnected manner that enables use of path-based searches to retrieve similar or related information from different electronic documents 124. In some implementations, the search engine 120 associated with the searchable data structure 130 can use the queries to the searchable data structure 130 to generate search heuristic(s) 122 that reduce search time, retrieve more relevant information, or both.

FIG. 2 is a diagram illustrating aspects of generation of the searchable data structure 130 based on one or more electronic documents 124 according to a particular implementation of the system 100 of FIG. 1. The operations described with reference to FIG. 2 may be performed by the processor(s) 104 of FIG. 1 executing instructions 110 from the memory device(s) 106.

The diagram illustrated in FIG. 2 show one example of generating the input data 126 for the document parsing model(s) 114 of FIG. 1 based on an electronic document 124. For convenience of illustration, only a single page of one electronic document 124 is shown in FIG. 2; however, the electronic document(s) 124 may include more than one document and each document may include more than one page. Additionally, the electronic document 124 illustrated in FIG. 2 is formatted to include several examples of different types of functional regions, which are discussed further with reference to FIG. 3. Other pages of the electronic document 124 and other electronic documents may include more, fewer, or different types of functional regions. Further, FIG. 2 illustrates one example of how various functional regions may be distinguished in a graphical layout of content items. In other examples, the functional regions may be distinguished in other ways. To illustrate, the electronic documents 124 of FIG. 2 includes information arranged in a table that does not have gridlines; however, another page of the electronic document 124 or a different electronic document may include information arranged in a table that does have gridlines.

In FIG. 2, the electronic document 124 is stored as, includes, or is included within electronic document data 202. The electronic document data 202 includes pixel data 204, text 206, other data 208 (such as formatting information, file metadata, etc.), or a combination thereof. In some implementations, the text 206 is determined based on the pixel data 204, for example via an optical character recognition process. In other implementations, the other data 208 includes mark-up language information describing the graphical layout of the text 206 (and possibly other content items), and the pixel data 204 is determined based on the text 206 and the other data 208.

In the example illustrated in FIG. 2, the electronic document data 202 is provided to pre-processing instructions 210. In this example, the pre-processing instructions 210 are part of instructions 110 of FIG. 1. In some implementations, the machine-learning models 113 include the pre-processing instructions 210 (e.g., the pre-processing instructions 210 include or correspond to a trained model). In other implementations, the pre-processing instructions 210 are distinct from the machine-learning models 113.

Figure 3:
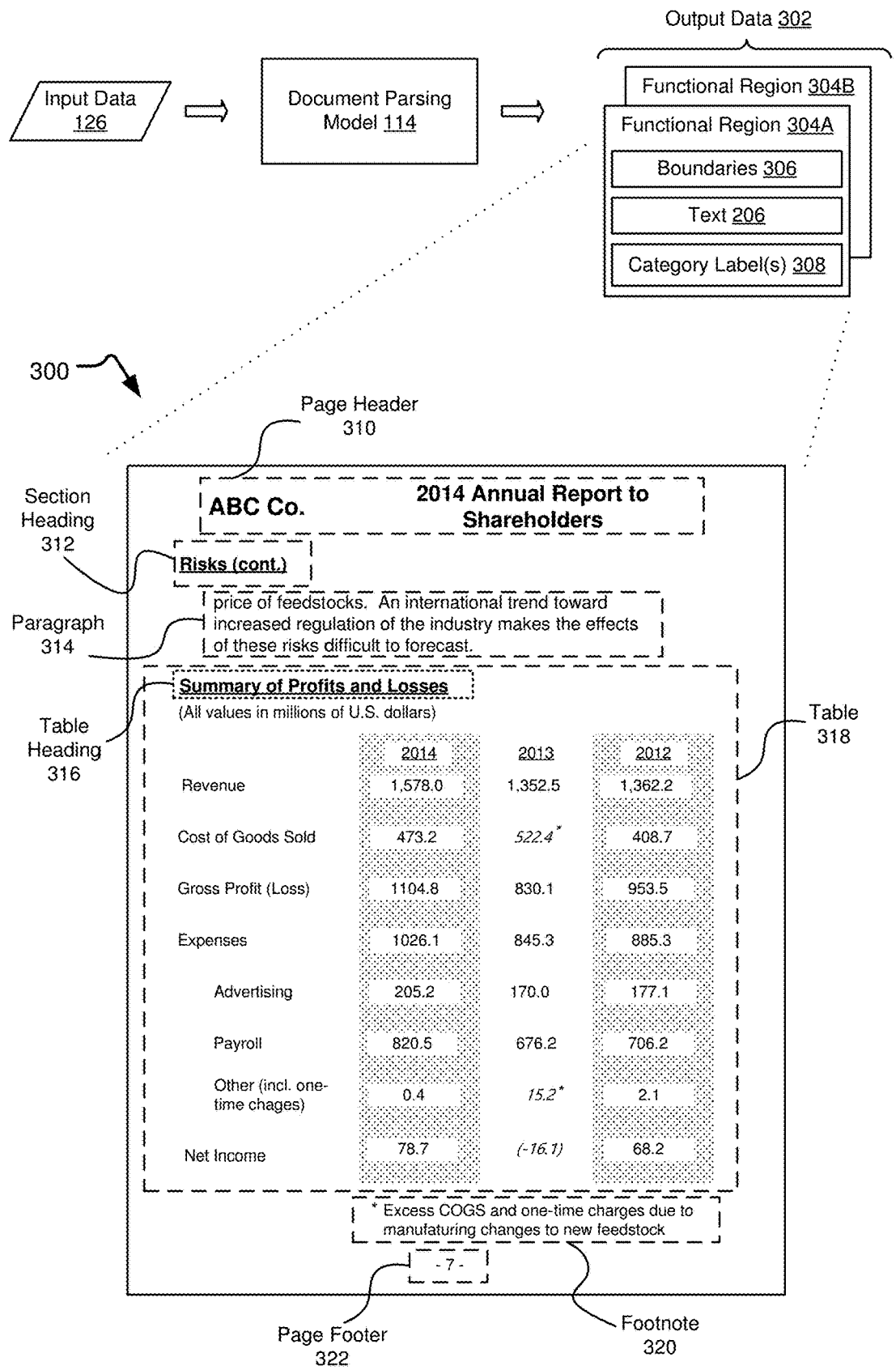
FIG. 3 is a diagram illustrating aspects of generation of a searchable data structure based on one or more electronic documents according to a particular implementation of FIG. 1.

The pre-processing instructions 210 generate the input data 126 based on the electronic document data 202. As one example, the pre-processing instructions 210 may generate the input data 126 as a vector of values encoding all of, or a portion of, the pixel data 204, the text 206, and the other data 208. To illustrate, the vector of values corresponding to the input data 126 may include or encode the pixel data 204 and the text 206. As another illustrative example, the vector of values corresponding to the input data 126 may include or encode the pixel data 204 and data representative of a portion of the text 206, the other data 208, or both. In this illustrative example, the data representative of a portion of the text 206, the other data 208, or both, may include n-grams or skip grams representing words, phrases, data values, or other information from the text 206, the other data 208, or both FIG. 3 is a diagram illustrating aspects of generation of the searchable data structure 130 based on the electronic document(s) 124 according to a particular implementation of the system 100 of FIG. 1. The diagram illustrated in FIG. 3 shows an example of output data 302 of the document parsing model(s) 114 including information identifying a plurality of functional regions 134 (such as a first functional region 304A and a second functional region 304B) of an electronic document 124 of FIGS. 1 and 2.

Although two functional regions 304A and 304B are illustrated in FIG. 3, the electronic document 124 may include more than two functional regions. For example, FIG. 3 includes a diagram 300 illustrating the example page of the electronic document 124 of FIG. 2 with various functional regions identified. In the diagram 300, each functional region is denoted by a dashed line indicating a boundary of the functional region. For example, in the diagram 300, the functional regions 134 include a page header 310, a section heading 312, a paragraph 314, a table 318, a footnote 320, and a page footer 322.

In some implementations, subregions of certain types of functional regions 134 may also be identified and associated with boundaries 136. For example, in FIG. 3, a table heading 316 is associated with a boundary indicated by a dotted line. Additional subregions of the table 318 are illustrated and described with reference to FIG. 4.

Although FIG. 3 illustrates examples of six different types of functional regions, the electronic document(s) 124 can include more or fewer than six different types of functional regions. Examples of other types of functional regions include images and lists.

FIGS. 4 and 5 together illustrate aspects of generation of the searchable data structure 130 based on the electronic document(s) 124 according to a particular implementation of the system 100 of FIG. 1. The example illustrated in FIG. 4 includes a diagram illustrating various functional subregions of the table 318, and FIG. 5 illustrates an example of a searchable data structure 130 based on the functional subregions of the table 318.

In FIG. 4, the functional subregions include the table heading 316, columns 404, column headers 406, rows 408A-408H, row headers 402, and a sub-table 410. In some implementations, one or more of the functional subregions of the table 318 includes its own subregions. To illustrate, in FIG. 4, the table 318 includes sub-table 410 as a functional subregion. In this illustrative example, the sub-table 410 may include one or more subregions, such as rows 408D-408G.

FIG. 5 represents the searchable data structure 130 as a connected graph or tree structure including multiple nodes. Each node is either a branch node having one or more subordinate nodes or a leaf node having no subordinate nodes. Each node stores text, category labels, other content items (e.g., embedded images), or a combination thereof, associated with a functional region or a functional subregion of the electronic document 124.

In the example illustrated in FIG. 5, the searchable data structure 130 includes a branch node 502 that represents the entire table 318 (also referred to as a root node), and the branch node 502 stores text associated with the entire table, such as text of the table heading 316. In this example, the searchable data structure 130 also includes a set of branch nodes corresponding to the columns 404 of the table 318, each of which stores text of a respective column header. To illustrate, branch node 504 corresponds to a column with the column header text "2014". In the example illustrated in FIG. 5, the branch node 502 is also coupled to other subordinate nodes corresponding to other columns 404 of the table 318.

Further, in this example, the searchable data structure 130 includes several nodes that are subordinate to the branch node 504, such as node 506 and node 510. The node 506 is an example of a node that corresponds to a row of the table 318, and as such, the node 506 stores text of one of the row headers 402 (e.g., "Revenue" corresponding to row 408A). Further, in the example of FIG. 5, the node 506 is coupled to a leaf node 508 that include a content item (e.g., a value or text representing a value) associated with a table data element associated with the "2014" column and the "Revenue" row of the table 318. In the example illustrated in FIG. 5, the branch node 504 is also coupled to other subordinate nodes corresponding to other rows 408 of the table 318.

In the example of FIG. 5, the node 510 stores text (e.g., "Expenses") representing row 408D, which is a summary row of the sub-table 410. The node 510 is coupled to a leaf node 512 that includes a content item (e.g., a value or text representing a value) associated with a table data element associated with the "2014" column and the "Expenses" row of the table 318. The node 510 is also coupled to subordinate nodes representing portions of the sub-table 410. For example, the node 510 is coupled to node 514, which represents row 408E of the sub-table 410 and stores corresponding text (e.g., "Advertising"). The node 510 and each of the other nodes at the same hierarchical level of the searchable data structure 130 are coupled to respective leaf nodes that include content items (e.g., a value or text representing a value) from the table 318. To illustrate, the node 510 is coupled (via the node 514) to a leaf node 516 that stores the value 205.2 (or text representing the value), which corresponds to the "Advertising" row 408E and the "2014" column of the sub-table 410 of FIG. 4.

FIG. 5 represents an example of the searchable data structure 130 formatted as a tree or graph. In other implementations, other hierarchical arrangements of data may be used. In a particular implementation, the topology of the searchable data structure 130 is determined based on the category labels assigned by the document parsing model(s) 114 of FIG. 1. For example, the searchable data structure 130 illustrated in FIG. 5 includes three branch nodes coupled to the branch node 502 because the table 318 includes three data columns 404. If the table 318 includes seven data columns 404, the searchable data structure 130 of FIG. 5 would include seven branch nodes coupled to the branch node 502. As another example, the table 318 includes a sub-table 410 listing examples of Expenses, and as a result, the node 510 of the searchable data structure 130 includes subordinate nodes corresponding to the rows of the sub-table 410.

In other implementations, the searchable data structure 130 hierarchically arranges information derived from the table 318 in a different manner. To illustrate, nodes representing the columns 404 of the table 318 may be subordinate to nodes representing the rows 408 of the table 318.

In the example illustrated in FIGS. 2-4, the table 318 does not include gridlines. In other examples, a table includes gridlines that define or distinguish table data cells, columns, rows, headers, or a combination thereof. In the example illustrated in FIGS. 2-4, the data cells, columns, rows, headers, or a combination thereof, of the table 318 are distinguished by alignment, spacing, position, font characteristics, background color, or a combination thereof. To illustrate, the document parsing model(s) 114 of FIG. 1 may identify the columns 404 of the table 318 based on vertical (with respect to a page orientation) alignment of text of each of the columns 404. As another illustrative example, the document parsing model(s) 114 of FIG. 1 may identify the columns 404 of the table 318 based on the presence of vertical background color bands (illustrated with shading in FIG. 5). In some implementations, the document parsing model(s) 114 may also consider other factors, such as the presence of column headers 406. It should be understood that the examples above are merely illustrative. When the document parsing model(s) 114 are a trained machine-learning model, it may not be obvious to a human observer which specific information represented by the input data 126 results in a specific functional region 134 of an electronic document 124 being identified as a table, a column, a row, etc.

In some implementations, one or more of the columns 404 may not be associated with a column header 406. In such implementations, the NLP model(s) 116 can be used to determine a semantic group represented by text of data elements of the column. For example, if the table 318 included a set of vertically aligned data elements with no clear column heading and including the text such as: Dallas, Miami, Tokyo, London, and Mumbai, the NLP model 116 may determine a column header for the column based on a semantic analysis of the text of the data elements. In this example, the column header may be, for example, "City".

An interconnected set of nodes of the searchable data structure 130 of FIG. 5 define a data path that can be used to generate a rule of the search heuristic(s) 122 of FIG. 1. To illustrate, if a user searches for advertising expenses in 2014 and indicates that the data path:

Summary of Profits and
Losses|2014|Expenses|Advertising provides the sought after information, a rule can be generated indicating that advertising for a particular year ("Year") may be accessed at data path:

Summary of Profits and Losses|Year|Expenses|Advertising

Accordingly, if a user subsequently generates a query for Advertising expenses for another year, the search query may be supplemented with information from the data path to improve knowledge retrieval.

Figure 6:
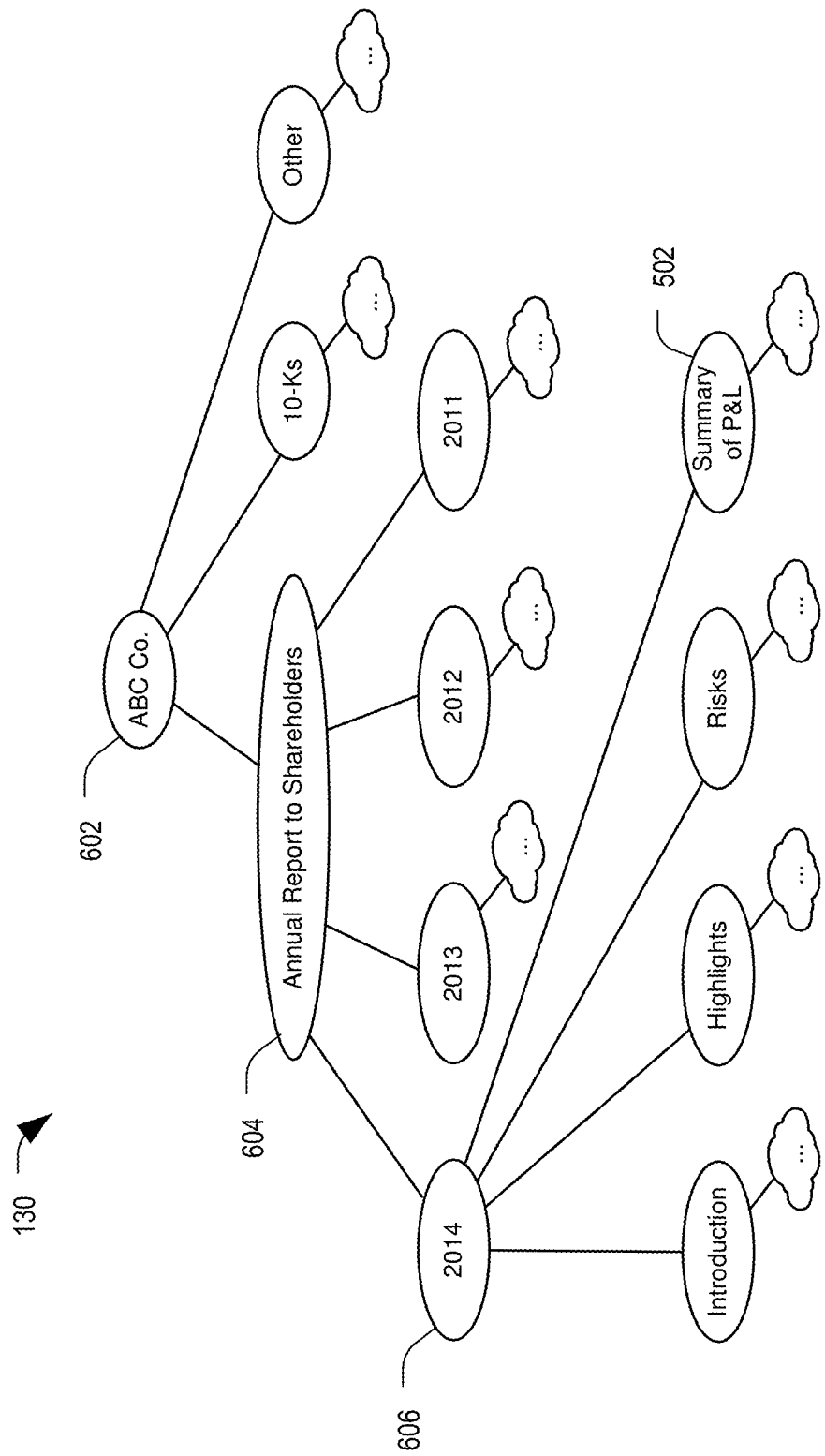
FIG. 6 is a diagram illustrating at least a portion of a searchable data structure according to a particular implementation of FIG. 1.

FIG. 6 is a diagram illustrating at least a portion of a searchable data structure 130 according to a particular implementation of the system 100 of FIG. 1. In the example illustrated in FIG. 6, the searchable data structure 130 stores data based on an entire corpus of electronic documents, such as records of a company. FIG. 6 represents the searchable data structure 130 formatted as a tree or graph; however, in other implementations, other hierarchical arrangements of the data are used.

As described with reference to FIG. 5, the topology of the searchable data structure 130 may be determined based on the category labels assigned by the document parsing model(s) 114 during processing of the corpus of electronic documents. For example, the searchable data structure 130 illustrated in FIG. 6 includes a root node 602 and three branch nodes subordinate to the root node 602. The root node 602, in this example, stores data derived from page headers, page footers, coversheets, or other functional regions that are common to many of the electronic documents of the corpus and that are associated with particular category labels. In the particular example illustrated in FIG. 6, the branch nodes stemming from the root node 602 represent particular categories or types of electronic documents, such as annual shareholder reports 604, 10-K filings, and other documents. In other examples, the searchable data structure 130 includes more, fewer, or different brand nodes coupled to the root node 602.

In the example illustrated in FIG. 6, the node 502 and nodes subordinate thereto store data derived from the table 318 of FIGS. 3 and 4. For example, the node 502 of FIG. 6 may be coupled to one or more of the nodes illustrated in FIG. 5. As explained with reference to FIG. 5, the searchable data structure 130 of FIG. 6 defined data paths that can be used to generate the search heuristic(s) 122.

Figure 7:
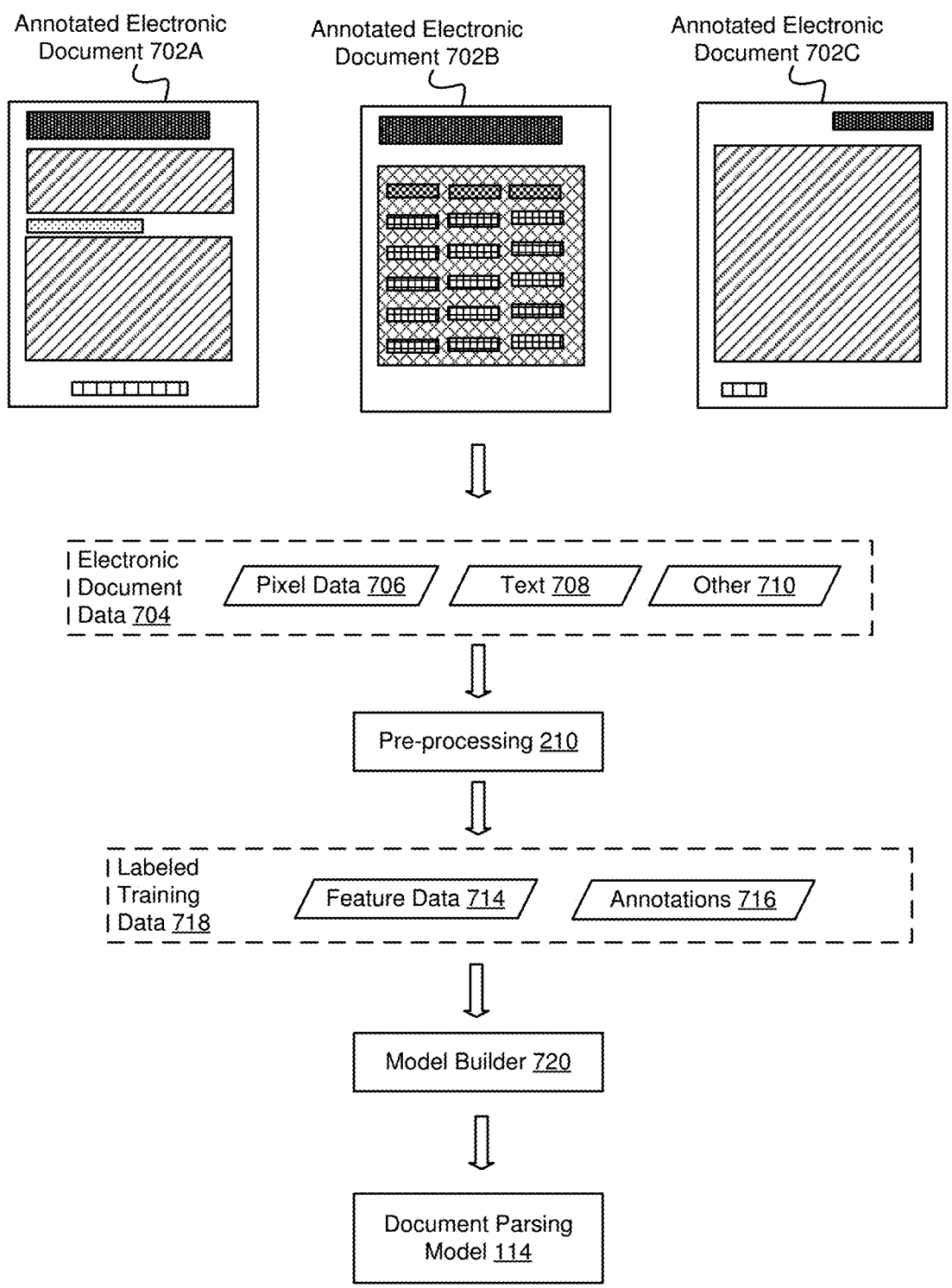
FIG. 7 is a diagram illustrating aspects of generating a document parsing model usable by the system of FIG. 1.

FIG. 7 is a diagram illustrating aspects of generating the document parsing model(s) 114 of FIG. 1. The operations described with reference to FIG. 7 may be performed by the processor(s) 104 of FIG. 1 executing instructions 110 from the memory device(s) 106. For example, the instructions 110 may include a model builder 720, as described further below, which may be executed by the processor(s) 104. Alternatively, in some implementations, the operations described with reference to FIG. 7 may be performed by another computing device, and the document parsing model(s) 114 can subsequently be provided to the computing device(s) 102 for execution.

The operations illustrated in FIG. 7 use a set of annotated electronic documents (e.g., documents 702A, 702B, 702C). Various functional regions are annotated in each of the annotated electronic documents 702. The annotations indicate boundaries of the various functional regions and a category label associated with each. The category labels indicate the function (e.g., the syntactical or structural purpose) of content within each functional region. Examples of category labels include page headers, page footers, section headings, paragraphs, tables, images, footnotes, and lists.

The annotated electronic documents 702 are stored as, include, or correspond to electronic document data 704. The electronic document data 704 includes pixel data 706, text 708, other data 710, or a combination thereof. The electronic document data 704 is provided as input to the pre-processing instructions 210 to generate feature data 714. In a particular implementation, the feature data 714 includes a vector of values representing the electronic document data 704.

The feature data 714 and data representing the annotations 716 are provided as labeled training data 718 to model builder 720. The model builder 720 is configured to perform operations to generate the document parsing model(s) 114, the NLP model(s) 116, or both. An example of the model builder 720 is described with reference to FIG. 10.

Figure 8:
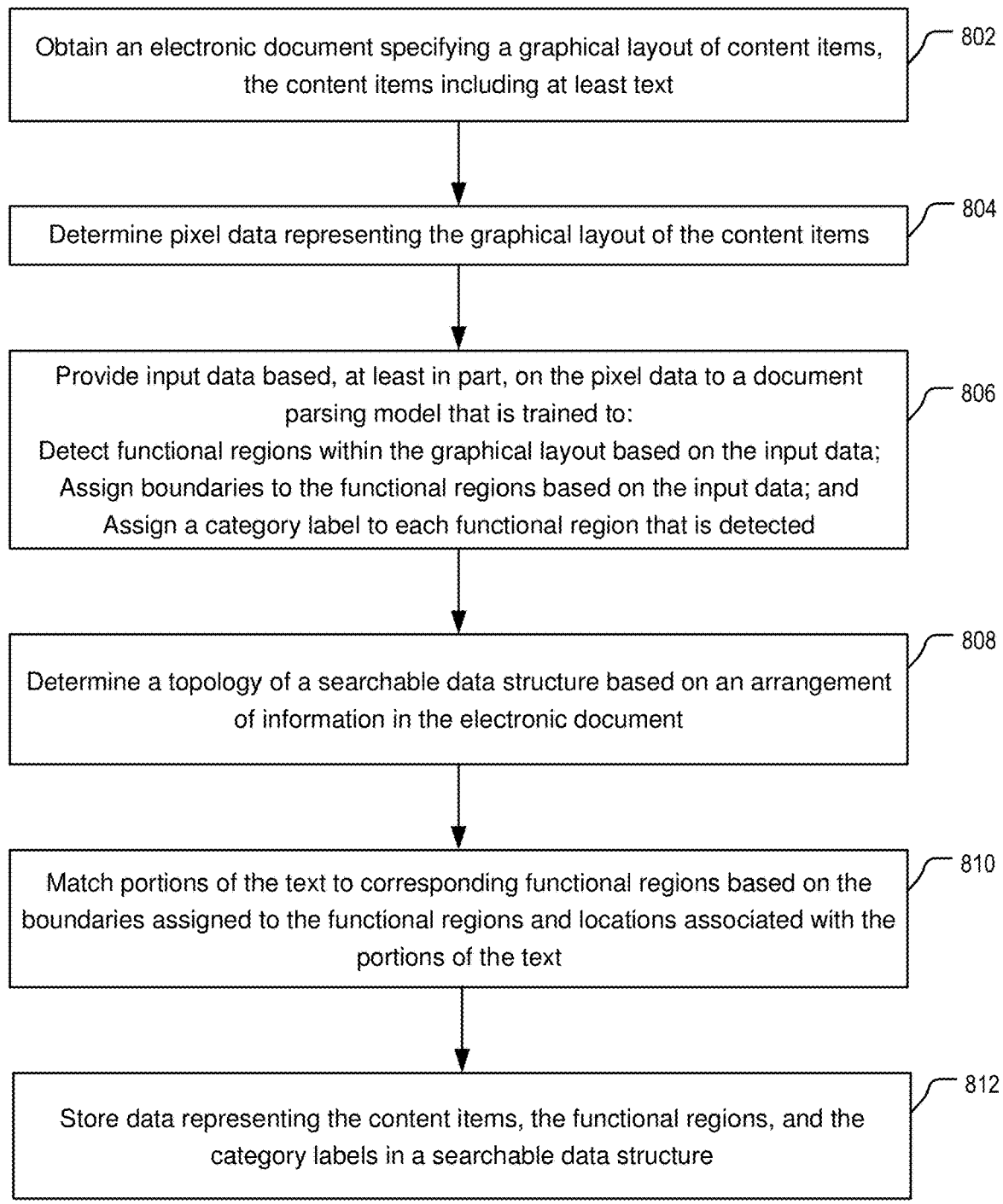
FIG. 8 is a flow chart of an example of a method that can be initiated, controlled, or performed by the system of FIG. 1.

FIG. 8 is a flow chart of an example of a method 800 that can be initiated, controlled, or performed by the system 100 of FIG. 1. The method 800 includes an example of operations that may be performed to generate the searchable data structure 130 based on an electronic document 124.

The method 800 includes, at 802, obtaining an electronic document specifying a graphical layout of content items, where the content items include at least text. For example, the electronic document data 202 representing the electronic document 124 may be accessed from the memory device(s) 106, the data repository 150, or both. The electronic document may include, for example, an image file representing a scanned document, a text editor document, a mark-up language document, a portable document format document, a spreadsheet, a document in another business office format, or a combination thereof (e.g., linked or cross-referenced files that form a single document for display).

The method 800 includes, at 804, determining pixel data representing the graphical layout of the content items. The pixel data defines a plurality of display elements to render a display of the electronic document, and each display element encodes at least one color bit representing a display color of the display element.

The method 800 includes, at 806, providing input data based, at least in part, on the pixel data to one or more of the document parsing model(s) 114. The document parsing model(s) 114 are trained to detect functional regions 134 within the graphical layout based on the input data. For example, the functional regions 134 detected by a document parsing model(s) 114 may include two or more of a page header, a page footer, a section heading, a paragraph, a table, an image, a footnote, or a list.

Additionally, the document parsing model(s) 114 are trained to assign boundaries 136 to the functional regions 134 based on the input data and to assign a category label 140 to each functional region 134 that is detected. For example, a document parsing model assigns a category label to a particular functional region based on a probabilistic analysis of the pixel data associated with the particular functional region. In a particular implementation, the input data is further based on text of the electronic document, and a document parsing model assigns category label(s) further based, at least in part, on a semantic analysis of the text.

In some implementations, the data specifying the graphical layout of the content items indicates font characteristics for particular text associated with a particular functional region, and a document parsing model assigns a particular category label to the particular functional region based on at least one of the font characteristics of the particular text or a change of the font characteristics between the particular functional region and an adjacent functional region. In some implementations, the data specifying the graphical layout of the content items indicates character spacing in particular text associated with a particular functional region, and a document parsing model assigns a particular category label to the particular functional region based on at least one of the character spacing of the particular text or a change of the character spacing between the particular functional region and an adjacent functional region. In some implementations, the data specifying the graphical layout of the content items indicates a background color associated with a particular functional region, and a document parsing model assigns a particular category label to the particular functional region based on at least one of the background color or a change in background color between the particular functional region and an adjacent functional region. In some implementations, text of a particular functional region includes one or more special characters, and a document parsing model assigns a particular category label to the particular functional region based on a determination that the one or more special characters are present in the particular function region.

In some implementations, an electronic document includes a functional region that is identified (e.g., labeled by the document parsing model(s) 114) as a table. In such implementations, one or more of the document parsing model(s) 114 may identify various portions (e.g., subregions) of the table, such as columns, rows, cells, etc. For example, a document parsing model may estimate column boundaries and row boundaries based on the input data associated with the particular functional region. A document parsing model may also determine a column heading of a column based on the text associated within the particular functional region. For example, a document parsing model may cause a natural-language processing model to determine a semantic group represented by text of the column, and the document parting model may assign the column heading based on the semantic group identified by the natural-language processing model. A document parsing model may store a portion of the text associated within the particular functional region in a first data element of the searchable data structure and store the column heading of the column in a second data element, where the first data element is subordinate to the second data element in the searchable data structure.

In some implementations, the method 800 includes, at 808, determining a topology of the searchable data structure 130 based on an arrangement of information in the electronic document 124. For example, the category labels 140 assigned by the document parsing model(s) 114 may be mapped to hierarchy data that indicates an order to be associated with various types of functional regions 134. To illustrate, the hierarchy data may indicate that a functional region labeled as a paragraph is subordinate to a functional region labeled as a section heading. In some implementations, the searchable data structure 130 has a tree structure including a plurality of leaf nodes. In such implementations, each leaf node is associated with a corresponding branch node, and the content items are assigned to nodes of the tree structure such that a hierarchy of the functional regions is represented in the tree structure.

The method 800 also includes, at 810, matching portions of the text to corresponding functional regions based on the boundaries assigned to the functional regions and locations associated with the portions of the text and, at 812, storing data representing the content items, the functional regions, and the category labels in the searchable data structure. A searchable data structure 130 formed according to the method 800 is a knowledge representation of the electronic document(s) 124 used to form the searchable data structure 130. Additionally, the searchable data structure 130 has a smaller in-memory footprint than electronic document(s) 124 and can be used to form search heuristic(s) 122 that improve information retrieval, as described further with reference to FIG. 9.

Figure 9:
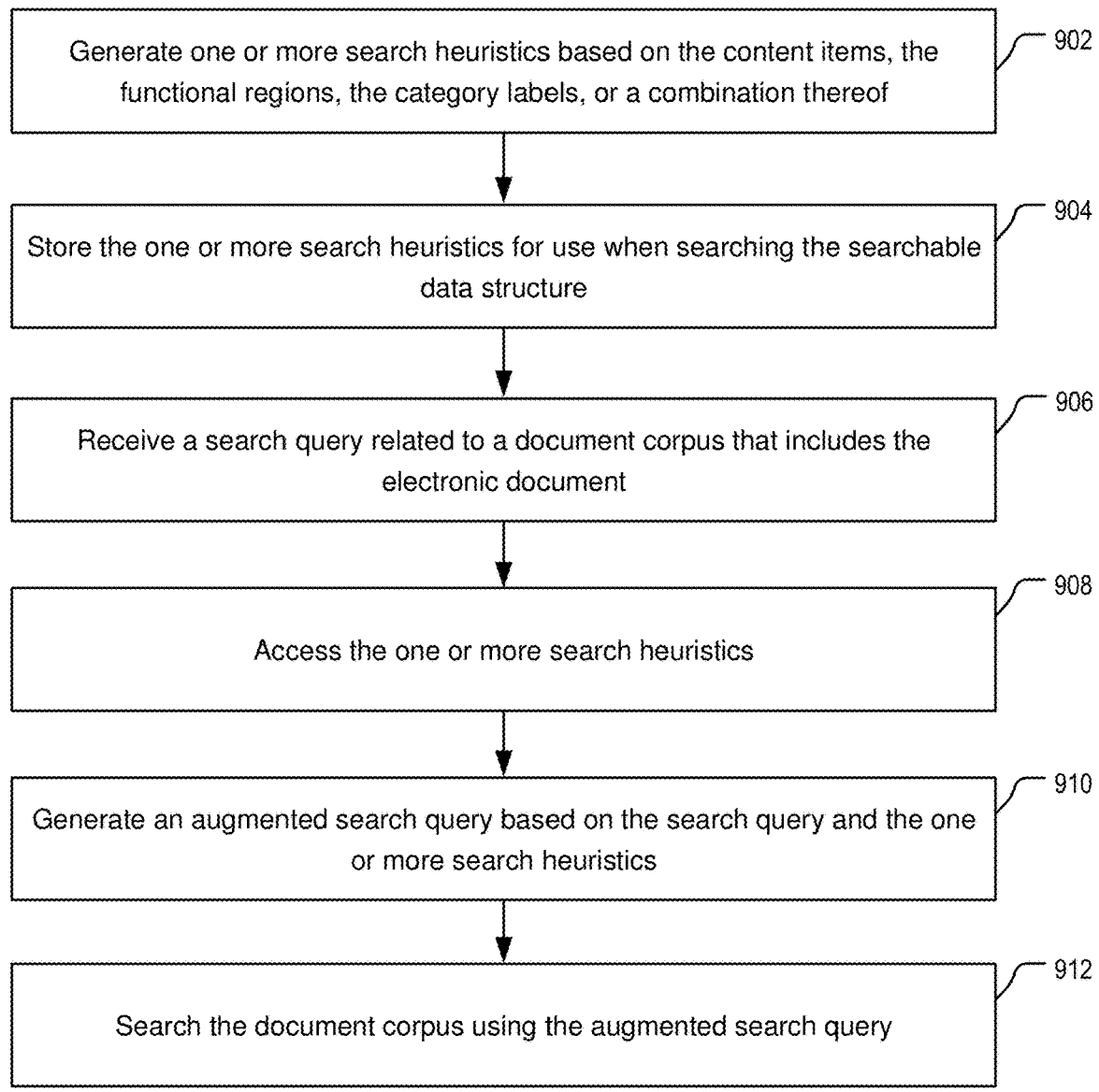
FIG. 9 is a flow chart of another example of a method that can be initiated, controlled, or performed by the system of FIG. 1.

FIG. 9 is a flow chart of another example of a method 900 that can be initiated, controlled, or performed by the system of FIG. 1. The method 900 includes an example of operations that may be performed to facilitate information retrieval from a searchable data structure 130 based on a document corpus (e.g., a collection of electronic documents).

The method 900 includes, after storing data in the searchable data structure, such as the searchable data structure 130 of FIG. 1, generating one or more search heuristics based on the content items, the functional regions, the category labels, or a combination thereof, at 902. For example, a rule of the one or more search heuristics may indicate a data path to retrieve particular information.

The method 900 also includes, at 904, storing the search heuristic(s) for use when searching the searchable data structure. For example, the search heuristic(s) 122 may a search query or search terms or search results and a data path that was used to retrieve information sought by the search query.

After storing the search heuristic(s), the method 900 includes, at 906, receiving a search query related to the document corpus and, at 908, accessing the search heuristic(s). The method 900 further includes, at 910, generating an augmented search query based on the search query and the search heuristic(s) and, at 912, searching the document corpus using the augmented search query. For example, the search query may be augmented by addition of a relevant data path to the search query or to a portion of the search query.

Figure 10:
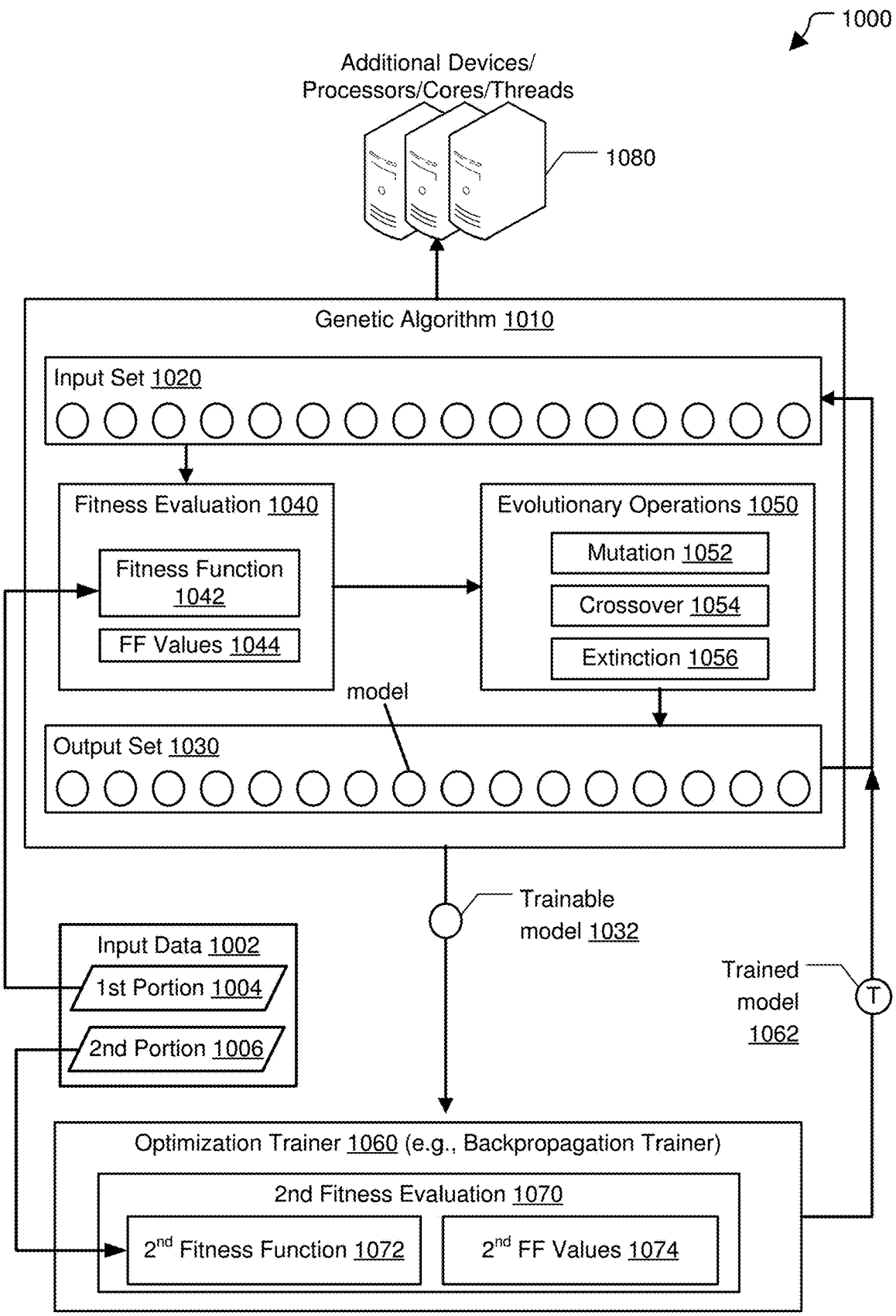
FIG. 10 is a diagram illustrating details of one example of automated model builder instructions to generate one or more of the machine-learning models of FIG. 1.

Referring to FIG. 10, a particular illustrative example of a system 1000 executing automated model builder instructions is shown. In a particular implementation, the automated model builder instructions include, are included within, or correspond to the model builder 720 of FIG. 7. The system 1000, or portions thereof, may be implemented using (e.g., executed by) one or more computing devices, such as laptop computers, desktop computers, mobile devices, servers, and Internet of Things devices and other devices utilizing embedded processors and firmware or operating systems, etc. In the illustrated example, the automated model builder instructions include a genetic algorithm 1010 and an optimization trainer 1060. The optimization trainer 1060 is, for example, a backpropagation trainer, a derivative free optimizer (DFO), an extreme learning machine (ELM), etc. In particular implementations, the genetic algorithm 1010 is executed on a different device, processor (e.g., central processor unit (CPU), graphics processing unit (GPU) or other type of processor), processor core, and/or thread (e.g., hardware or software thread) than the optimization trainer 1060. The genetic algorithm 1010 and the optimization trainer 1060 are executed cooperatively to automatically generate a machine-learning model (e.g., one or more of the machine-learning models 113 of FIG. 1 and referred to herein as "models" for ease of reference) based on the input data 1002 (such as the labeled training data 718 of FIG. 7). The system 1000 performs an automated model building process that enables users, including inexperienced users, to quickly and easily build highly accurate models based on a specified data set.

During configuration of the system 1000, a user specifies the input data 1002. In some implementations, the user can also specify one or more characteristics of models that can be generated. In such implementations, the system 1000 constrains models processed by the genetic algorithm 1010 to those that have the one or more specified characteristics. For example, the specified characteristics can constrain allowed model topologies (e.g., to include no more than a specified number of input nodes or output nodes, no more than a specified number of hidden layers, no recurrent loops, etc.). Constraining the characteristics of the models can reduce the computing resources (e.g., time, memory, processor cycles, etc.) needed to converge to a final model, can reduce the computing resources needed to use the model (e.g., by simplifying the model), or both.

The user can configure aspects of the genetic algorithm 1010 via input to graphical user interfaces (GUIs). For example, the user may provide input to limit a number of epochs that will be executed by the genetic algorithm 1010. Alternatively, the user may specify a time limit indicating an amount of time that the genetic algorithm 1010 has to execute before outputting a final output model, and the genetic algorithm 1010 may determine a number of epochs that will be executed based on the specified time limit. To illustrate, an initial epoch of the genetic algorithm 1010 may be timed (e.g., using a hardware or software timer at the computing device executing the genetic algorithm 1010), and a total number of epochs that are to be executed within the specified time limit may be determined accordingly. As another example, the user may constrain a number of models evaluated in each epoch, for example by constraining the size of an input set 1020 of models and/or an output set 1030 of models.

The genetic algorithm 1010 represents a recursive search process. Consequently, each iteration of the search process (also called an epoch or generation of the genetic algorithm 1010) has an input set 1020 of models (also referred to herein as an input population) and an output set 1030 of models (also referred to herein as an output population). The input set 1020 and the output set 1030 may each include a plurality of models, where each model includes data representative of a machine learning data model. For example, each model may specify a neural network or an autoencoder by at least an architecture, a series of activation functions, and connection weights. The architecture (also referred to herein as a topology) of a model includes a configuration of layers or nodes and connections therebetween. The models may also be specified to include other parameters, including but not limited to bias values/functions and aggregation functions.

For example, each model can be represented by a set of parameters and a set of hyperparameters. In this context, the hyperparameters of a model define the architecture of the model (e.g., the specific arrangement of layers or nodes and connections), and the parameters of the model refer to values that are learned or updated during optimization training of the model. For example, the parameters include or correspond to connection weights and biases.

In a particular implementation, a model is represented as a set of nodes and connections therebetween. In such implementations, the hyperparameters of the model include the data descriptive of each of the nodes, such as an activation function of each node, an aggregation function of each node, and data describing node pairs linked by corresponding connections. The activation function of a node is a step function, sine function, continuous or piecewise linear function, sigmoid function, hyperbolic tangent function, or another type of mathematical function that represents a threshold at which the node is activated. The aggregation function is a mathematical function that combines (e.g., sum, product, etc.) input signals to the node. An output of the aggregation function may be used as input to the activation function.

In another particular implementation, the model is represented on a layer-by-layer basis. For example, the hyperparameters define layers, and each layer includes layer data, such as a layer type and a node count. Examples of layer types include fully connected, long short-term memory (LSTM) layers, gated recurrent units (GRU) layers, and convolutional neural network (CNN) layers. In some implementations, all of the nodes of a particular layer use the same activation function and aggregation function. In such implementations, specifying the layer type and node count fully may describe the hyperparameters of each layer. In other implementations, the activation function and aggregation function of the nodes of a particular layer can be specified independently of the layer type of the layer. For example, in such implementations, one fully connected layer can use a sigmoid activation function and another fully connected layer (having the same layer type as the first fully connected layer) can use a tanh activation function. In such implementations, the hyperparameters of a layer include layer type, node count, activation function, and aggregation function. Further, a complete autoencoder is specified by specifying an order of layers and the hyperparameters of each layer of the autoencoder.

In a particular aspect, the genetic algorithm 1010 may be configured to perform speciation. For example, the genetic algorithm 1010 may be configured to cluster the models of the input set 1020 into species based on "genetic distance" between the models. The genetic distance between two models may be measured or evaluated based on differences in nodes, activation functions, aggregation functions, connections, connection weights, layers, layer types, latent-space layers, encoders, decoders, etc. of the two models. In an illustrative example, the genetic algorithm 1010 may be configured to serialize a model into a bit string. In this example, the genetic distance between models may be represented by the number of differing bits in the bit strings corresponding to the models. The bit strings corresponding to models may be referred to as "encodings" of the models.

After configuration, the genetic algorithm 1010 may begin execution based on the input data 1002. Parameters of the genetic algorithm 1010 may include but are not limited to, mutation parameter(s), a maximum number of epochs the genetic algorithm 1010 will be executed, a termination condition (e.g., a threshold fitness value that results in termination of the genetic algorithm 1010 even if the maximum number of generations has not been reached), whether parallelization of model testing or fitness evaluation is enabled, whether to evolve a feedforward or recurrent neural network, etc. As used herein, a "mutation parameter" affects the likelihood of a mutation operation occurring with respect to a candidate neural network, the extent of the mutation operation (e.g., how many bits, bytes, fields, characteristics, etc. change due to the mutation operation), and/or the type of the mutation operation (e.g., whether the mutation changes a node characteristic, a link characteristic, etc.). In some examples, the genetic algorithm 1010 uses a single mutation parameter or set of mutation parameters for all of the models. In such examples, the mutation parameter may impact how often, how much, and/or what types of mutations can happen to any model of the genetic algorithm 1010. In alternative examples, the genetic algorithm 1010 maintains multiple mutation parameters or sets of mutation parameters, such as for individual or groups of models or species. In particular aspects, the mutation parameter(s) affect crossover and/or mutation operations, which are further described below.

For an initial epoch of the genetic algorithm 1010, the topologies of the models in the input set 1020 may be randomly or pseudo-randomly generated within constraints specified by the configuration settings or by one or more architectural parameters. Accordingly, the input set 1020 may include models with multiple distinct topologies. For example, a first model of the initial epoch may have a first topology, including a first number of input nodes associated with a first set of data parameters, a first number of hidden layers including a first number and arrangement of hidden nodes, one or more output nodes, and a first set of interconnections between the nodes. In this example, a second model of the initial epoch may have a second topology, including a second number of input nodes associated with a second set of data parameters, a second number of hidden layers including a second number and arrangement of hidden nodes, one or more output nodes, and a second set of interconnections between the nodes. The first model and the second model may or may not have the same number of input nodes and/or output nodes. Further, one or more layers of the first model can be of a different layer type that one or more layers of the second model. For example, the first model can be a feedforward model, with no recurrent layers; whereas, the second model can include one or more recurrent layers.

The genetic algorithm 1010 may automatically assign an activation function, an aggregation function, a bias, connection weights, etc. to each model of the input set 1020 for the initial epoch. In some aspects, the connection weights are initially assigned randomly or pseudo-randomly. In some implementations, a single activation function is used for each node of a particular model. For example, a sigmoid function may be used as the activation function of each node of the particular model. The single activation function may be selected based on configuration data. For example, the configuration data may indicate that a hyperbolic tangent activation function is to be used or that a sigmoid activation function is to be used. Alternatively, the activation function may be randomly or pseudo-randomly selected from a set of allowed activation functions, and different nodes or layers of a model may have different types of activation functions. Aggregation functions may similarly be randomly or pseudo-randomly assigned for the models in the input set 1020 of the initial epoch. Thus, the models of the input set 1020 of the initial epoch may have different topologies (which may include different input nodes corresponding to different input data fields if the data set includes many data fields) and different connection weights. Further, the models of the input set 1020 of the initial epoch may include nodes having different activation functions, aggregation functions, and/or bias values/functions.

During execution, the genetic algorithm 1010 performs fitness evaluation 1040 and evolutionary operations 1050 on the input set 1020. In this context, fitness evaluation 1040 includes evaluating each model of the input set 1020 using a fitness function 1042 to determine a fitness function value 1044 ("FF values" in FIG. 10) for each model of the input set 1020. The fitness function values 1044 are used to select one or more models of the input set 1020 to modify using one or more of the evolutionary operations 1050. In FIG. 10, the evolutionary operations 1050 include mutation operations 1052, crossover operations 1054, and extinction operations 1056, each of which is described further below.

During the fitness evaluation 1040, each model of the input set 1020 is tested based on the input data 1002 to determine a corresponding fitness function value 1044. For example, a first portion 1004 of the input data 1002 may be provided as input data to each model, which processes the input data (according to the network topology, connection weights, activation function, etc., of the respective model) to generate output data. The output data of each model is evaluated using the fitness function 1042 and the first portion 1004 of the input data 1002 to determine how well the model modeled the input data 1002. In some examples, fitness of a model is based on reliability of the model, performance of the model, complexity (or sparsity) of the model, size of the latent space, or a combination thereof.

In a particular aspect, fitness evaluation 1040 of the models of the input set 1020 is performed in parallel. To illustrate, the system 1000 may include devices, processors, cores, and/or threads 1080 in addition to those that execute the genetic algorithm 1010 and the optimization trainer 1060. These additional devices, processors, cores, and/or threads 1080 can perform the fitness evaluation 1040 of the models of the input set 1020 in parallel based on a first portion 1004 of the input data 1002 and may provide the resulting fitness function values 1044 to the genetic algorithm 1010.

The mutation operation 1052 and the crossover operation 1054 are highly stochastic under certain constraints and a defined set of probabilities optimized for model building, which produces reproduction operations that can be used to generate the output set 1030, or at least a portion thereof, from the input set 1020. In a particular implementation, the genetic algorithm 1010 utilizes intra-species reproduction (as opposed to inter-species reproduction) in generating the output set 1030. In other implementations, inter-species reproduction may be used in addition to or instead of intra-species reproduction to generate the output set 1030. Generally, the mutation operation 1052 and the crossover operation 1054 are selectively performed on models that are more fit (e.g., have higher fitness function values 1044, fitness function values 1044 that have changed significantly between two or more epochs, or both).

The extinction operation 1056 uses a stagnation criterion to determine when a species should be omitted from a population used as the input set 1020 for a subsequent epoch of the genetic algorithm 1010. Generally, the extinction operation 1056 is selectively performed on models that are satisfy a stagnation criteria, such as modes that have low fitness function values 1044, fitness function values 1044 that have changed little over several epochs, or both.

In accordance with the present disclosure, cooperative execution of the genetic algorithm 1010 and the optimization trainer 1060 is used to arrive at a solution faster than would occur by using a genetic algorithm 1010 alone or an optimization trainer 1060 alone. Additionally, in some implementations, the genetic algorithm 1010 and the optimization trainer 1060 evaluate fitness using different data sets, with different measures of fitness, or both, which can improve fidelity of operation of the final model. To facilitate cooperative execution, a model (referred to herein as a trainable model 1032 in FIG. 10) is occasionally sent from the genetic algorithm 1010 to the optimization trainer 1060 for training. In a particular implementation, the trainable model 1032 is based on crossing over and/or mutating the fittest models (based on the fitness evaluation 1040) of the input set 1020. In such implementations, the trainable model 1032 is not merely a selected model of the input set 1020; rather, the trainable model 1032 represents a potential advancement with respect to the fittest models of the input set 1020.

The optimization trainer 1060 uses a second portion 1006 of the input data 1002 to train the connection weights and biases of the trainable model 1032, thereby generating a trained model 1062. The optimization trainer 1060 does not modify the architecture of the trainable model 1032.

During optimization, the optimization trainer 1060 provides a second portion 1006 of the input data 1002 to the trainable model 1032 to generate output data. The optimization trainer 1060 performs a second fitness evaluation 1070 by comparing the data input to the trainable model 1032 to the output data from the trainable model 1032 to determine a second fitness function value 1074 based on a second fitness function 1072. The second fitness function 1072 is the same as the first fitness function 1042 in some implementations and is different from the first fitness function 1042 in other implementations. In some implementations, the optimization trainer 1060 or portions thereof is executed on a different device, processor, core, and/or thread than the genetic algorithm 1010. In such implementations, the genetic algorithm 1010 can continue executing additional epoch(s) while the connection weights of the trainable model 1032 are being trained by the optimization trainer 1060. When training is complete, the trained model 1062 is input back into (a subsequent epoch of) the genetic algorithm 1010, so that the positively reinforced "genetic traits" of the trained model 1062 are available to be inherited by other models in the genetic algorithm 1010.

In implementations in which the genetic algorithm 1010 employs speciation, a species ID of each of the models may be set to a value corresponding to the species that the model has been clustered into. A species fitness may be determined for each of the species. The species fitness of a species may be a function of the fitness of one or more of the individual models in the species. As a simple illustrative example, the species fitness of a species may be the average of the fitness of the individual models in the species. As another example, the species fitness of a species may be equal to the fitness of the fittest or least fit individual model in the species. In alternative examples, other mathematical functions may be used to determine species fitness. The genetic algorithm 1010 may maintain a data structure that tracks the fitness of each species across multiple epochs. Based on the species fitness, the genetic algorithm 1010 may identify the "fittest" species, which may also be referred to as "elite species." Different numbers of elite species may be identified in different embodiments.

In a particular aspect, the genetic algorithm 1010 uses species fitness to determine if a species has become stagnant and is therefore to become extinct. As an illustrative non-limiting example, the stagnation criterion of the extinction operation 1056 may indicate that a species has become stagnant if the fitness of that species remains within a particular range (e.g., +/−5%) for a particular number (e.g., 5) of epochs. If a species satisfies a stagnation criterion, the species and all underlying models may be removed from subsequent epochs of the genetic algorithm 1010.

In some implementations, the fittest models of each "elite species" may be identified. The fittest models overall may also be identified. An "overall elite" need not be an "elite member," e.g., may come from a non-elite species. Different numbers of "elite members" per species and "overall elites" may be identified in different embodiments."

The output set 1030 of the epoch is generated based on the input set 1020 and the evolutionary operation 1050. In the illustrated example, the output set 1030 includes the same number of models as the input set 1020. In some implementations, the output set 1030 includes each of the "overall elite" models and each of the "elite member" models. Propagating the "overall elite" and "elite member" models to the next epoch may preserve the "genetic traits" resulted in caused such models being assigned high fitness values.

The rest of the output set 1030 may be filled out by random reproduction using the crossover operation 1054 and/or the mutation operation 1052. After the output set 1030 is generated, the output set 1030 may be provided as the input set 1020 for the next epoch of the genetic algorithm 1010.

After one or more epochs of the genetic algorithm 1010 and one or more rounds of optimization by the optimization trainer 1060, the system 1000 selects a particular model or a set of model as the final model (e.g., one of the machine-learning models 113). For example, the final model may be selected based on the fitness function values 1044, 1074. For example, a model or set of models having the highest fitness function value 1044 or 1074 may be selected as the final model. When multiple models are selected (e.g., an entire species is selected), an ensembler can be generated (e.g., based on heuristic rules or using the genetic algorithm 1010) to aggregate the multiple models. In some implementations, the final model can be provided to the optimization trainer 1060 for one or more rounds of optimization after the final model is selected. Subsequently, the final model can be output for use with respect to other data (e.g., real-time data).

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as, but not limited to, C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may take the form of or include a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the actions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Although the disclosure may include a method, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Particular aspects of the disclosure are described below in a first set of interrelated clauses:

According to Clause 1, a method of generating a searchable representation of an electronic document includes obtaining an electronic document specifying a graphical layout of content items, the content items including at least text; determining pixel data representing the graphical layout of the content items; providing input data based, at least in part, on the pixel data to a document parsing model that is trained to detect functional regions within the graphical layout based on the input data, to assign boundaries to the functional regions based on the input data, and to assign a category label to each functional region that is detected; matching portions of the text to corresponding functional regions based on the boundaries assigned to the functional regions and locations associated with the portions of the text; and storing data representing the content items, the functional regions, and the category labels in a searchable data structure.

Clause 2 includes the method of Clause 1 wherein the pixel data defines a plurality of display elements to render a display of the electronic document and each display element encodes at least one color bit representing a display color of the display element.

Clause 3 includes the method of Clause 1 or the method of Clause 2 wherein the searchable data structure comprises a tree structure having a plurality of leaf nodes, each leaf node associated with a corresponding branch node, and wherein the content items are assigned to nodes of the tree structure such that a hierarchy of the functional regions is represented in the tree structure.

Clause 4 includes the method of any of Clauses 1 to 3 and further comprises, after storing the data in the searchable data structure, generating one or more search heuristics based on the content items, the functional regions, the category labels, or a combination thereof; and storing the one or more search heuristics for use when searching the searchable data structure.

Clause 5 includes the method of Clause 4 and further comprises, after storing the one or more search heuristics, receiving a search query related to a document corpus that includes the electronic document; accessing the one or more search heuristics; generating an augmented search query based on the search query and the one or more search heuristics; and searching the document corpus using the augmented search query.

Clause 6 includes the method of any of Clauses 1 to 5 wherein the functional regions detected by the document parsing model include two or more of a page header, a page footer, a section heading, a paragraph, a table, an image, a footnote, or a list.

Clause 7 includes the method of any of Clauses 1 to 6 and further comprises for a particular functional region labeled as a table, estimating column boundaries and row boundaries based on the input data associated with the particular functional region; determining a column heading of a column based on the text associated within the particular functional region; storing a portion of the text associated within the particular functional region in a first data element of the searchable data structure; and storing the column heading of the column in a second data element, wherein the first data element is subordinate to the second data element in the searchable data structure.

Clause 8 includes the method of Clause 7 wherein determining the column heading includes using a natural-language processing model to determine a semantic group represented by text of the column.

Clause 9 includes the method of any of Clauses 1 to 8 wherein the data specifying the graphical layout of the content items indicates font characteristics for particular text associated with a particular functional region, and wherein the document parsing model assigns a particular category label to the particular functional region based on at least one of the font characteristics of the particular text or a change of the font characteristics between the particular functional region and an adjacent functional region.

Clause 10 includes the method of any of Clauses 1 to 9 wherein the data specifying the graphical layout of the content items indicates character spacing in particular text associated with a particular functional region, and wherein the document parsing model assigns a particular category label to the particular functional region based on at least one of the character spacing of the particular text or a change of the character spacing between the particular functional region and an adjacent functional region.

Clause 11 includes the method of any of Clauses 1 to 10 wherein the data specifying the graphical layout of the content items indicates a background color associated with a particular functional region, and wherein the document parsing model assigns a particular category label to the particular functional region based on at least one of the background color or a change in background color between the particular functional region and an adjacent functional region.

Clause 12 includes the method of any of Clauses 1 to 11 wherein the text includes one or more special characters, and wherein the document parsing model assigns a particular category label to a particular functional region based on a determination that the one or more special characters are present in the particular function region.

Clause 13 includes the method of any of Clauses 1 to 12 wherein the document parsing model is trained to assign a first category label to a particular functional region based on a probabilistic analysis of the pixel data associated with the particular functional region.

Clause 14 includes the method of any of Clauses 1 to 13 wherein the input data is further based on the text, and wherein the document parsing model is trained to assign a particular category label to a particular functional region further based on a semantic analysis of text associated with the particular functional region.

Clause 15 includes the method of any of Clauses 1 to 14 wherein the searchable data structure has a smaller in-memory footprint than the electronic document.

Clause 16 includes the method of any of Clauses 1 to 15 and further comprises determining a topology of the searchable data structure based on an arrangement of information in the electronic document.

Clause 17 includes the method of any of Clauses 1 to 16 wherein the document parsing model is trained using labeled training data based on a corpus of electronic documents, each electronic document of the corpus including a plurality of identified functional regions and a respective category label for each of the identified function regions.

According to Clause 18, a system comprises a memory storing instructions; and a processor configured to execute the instructions to perform operations. The operations include obtaining an electronic document that includes data specifying a graphical layout of content items, the content items including at least text; determining pixel data representing the graphical layout of the content items; providing input data based, at least in part, on the pixel data to a document parsing model that is trained to detect functional regions within the graphical layout based on the input data, to assign boundaries to the functional regions based on the input data, and to assign a category label to each functional region that is detected; matching portions of the text to corresponding functional regions based on the boundaries assigned to the functional regions and locations associated with the text; and storing a searchable data structure representing the content items, the functional regions, and the category labels.

Clause 19 includes the system of Clause 18 wherein the functional regions include two or more of a page header, a page footer, a section heading, a paragraph, a table, an image, a footnote, or a list.

Clause 20 includes the system of Clause 18 or Clause 19 wherein, for a particular functional region labeled as a table, the operations include estimating column boundaries and row boundaries based on the input data associated with the particular functional region; determining a column heading of a column based on the text associated within the particular functional region; storing a portion of the text associated within the particular functional region in a first data element of the searchable data structure; and storing the column heading of the column in a second data element, wherein the first data element is subordinate to the second data element in the searchable data structure.

Clause 21 includes the system of Clause 20 wherein determining the column heading includes using a natural-language processing model to determine a semantic group represented by text of the column.

Clause 22 includes the system of any of Clauses 18 to 21 wherein the data specifying the graphical layout of the content items indicates font characteristics for particular text associated with a particular functional region, and the document parsing model is configured to assign a particular category label to the particular functional region based on at least one of the font characteristics of the particular text or a change of the font characteristics between the particular functional region and an adjacent functional region.

Clause 23 includes the system of any of Clauses 18 to 22 wherein the data specifying the graphical layout of the content items indicates character spacing in particular text associated with a particular functional region, and the document parsing model is configured to assign a particular category label to the particular functional region based on at least one of the character spacing of the particular text or a change of the character spacing between the particular functional region and an adjacent functional region.

Clause 24 includes the system of any of Clauses 18 to 23 wherein the data specifying the graphical layout of the content items indicates a background color associated with a particular functional region, wherein and the document parsing model is configured to assign a particular category label to the particular functional region based on at least one of the background color or a change in background color between the particular functional region and an adjacent functional region.

Clause 25 includes the system of any of Clauses 18 to 24 wherein the text includes one or more special characters and the document parsing model is configured to assign a particular category label to a particular functional region based on a determination that the one or more special characters are present in the particular function region.

Clause 26 includes the system of any of Clauses 18 to 25 wherein the document parsing model is trained to assign a first category label to a particular functional region based on probabilistic analysis of the pixel data associated with the particular functional region.

Clause 27 includes the system of any of Clauses 18 to 26 wherein the input data is further based on the text and the document parsing model is trained to assign a particular category label to a particular functional region further based on a semantic analysis of text associated with the particular functional region.

Clause 28 includes the system of any of Clauses 18 to 27 wherein the searchable data structure has a smaller in-memory footprint than the electronic document.

Clause 29 includes the system of Clause 28 wherein the searchable data structure comprises a tree structure having a plurality of leaf nodes, each leaf node associated with a corresponding branch node, and wherein the content items are assigned to nodes of the tree structure such that a hierarchy of the functional regions is represented in the tree structure.

Clause 30 includes the system of any of Clauses 18 to 29 wherein the operations further comprise determining a topology of the searchable data structure based on an arrangement of information in the electronic document.

According to Clause 31, a non-transitory computer-readable medium stores instructions that are executable by a processor to cause the processor to perform operations comprising obtaining an electronic document that includes data specifying a graphical layout of content items, the content items including at least text; determining pixel data representing the graphical layout of the content items; providing input data based, at least in part, on the pixel data to a document parsing model that is trained to detect functional regions within the graphical layout based on the input data, to assign boundaries to the functional regions based on the input data, and to assign a category label to each functional region that is detected; matching portions of the text to corresponding functional regions based on the boundaries assigned to the functional regions and locations associated with the text; and storing a searchable data structure representing the content items, the functional regions, and the category labels.

Changes and modifications may be made to the disclosed embodiments without departing from the scope of the present disclosure. These and other changes or modifications are intended to be included within the scope of the present disclosure, as expressed in the following claims.

What is claimed is:

1. A method of generating a searchable representation of an electronic document, the method comprising:
   obtaining an electronic document that includes format data specifying a graphical layout of content items, the content items including unstructured text and structured at least text;
   determining pixel data representing the graphical layout of the content items;
   providing input data based, at least in part, on the pixel data to a document parsing model that is trained to:
      detect, within the graphical layout based on the input data, functional regions, the functional regions including first functional regions corresponding to the unstructured text and second functional regions corresponding to the structured text;
      assign, based on the input data, first boundaries to the first functional regions and second boundaries to the second functional regions; and
      assign a first category label to each first functional region and a second category label to each second functional region;
   matching first portions of the unstructured text to corresponding first category labels of first functional regions based on the first boundaries and locations associated with the first portions of the unstructured text;
   matching second portions of structured text to corresponding second category labels of second functional regions based on the second boundaries and locations associated with the second portions of structured text; and
   storing each first category label and corresponding first portions of unstructured text and each second category label and corresponding second portions of structured text as document data representing the content items in a searchable data structure, wherein the searchable data structure includes node elements for the first category labels and the second category labels.

2. The method of claim 1, wherein the pixel data defines a plurality of display elements to render a display of the electronic document and each display element encodes at least one color bit representing a display color of the display element.

3. The method of claim 1, wherein the searchable data structure comprises a tree structure having a plurality of leaf nodes, each leaf node associated with a corresponding branch node, and wherein the content items are assigned to nodes of the tree structure such that a hierarchy of the first functional regions and the second functional regions is represented in the tree structure.

4. The method of claim 1, further comprising, after storing the document data in the searchable data structure:
generating one or more search heuristics based on the content items, the first category labels, the second category labels, or a combination thereof; and
storing the one or more search heuristics for use when searching the searchable data structure.

5. The method of claim 4, further comprising, after storing the one or more search heuristics:
receiving a search query related to a document corpus that includes the electronic document;
accessing the one or more search heuristics;
generating an augmented search query based on the search query and the one or more search heuristics; and
searching the document corpus using the augmented search query.

6. The method of claim 1, wherein the content items further include semi-structured text.

7. The method of claim 1, further comprising for a particular second functional region corresponding to a table:
estimating column boundaries and row boundaries based on the input data associated with the particular second functional region;
determining a column heading of a column based on the structured text associated with the particular second functional region;
storing a portion of the structured text associated within the particular second functional region in a first data element of the searchable data structure as a particular second portion of the second portions; and
storing the column heading of the column in a second data element as a particular category label, wherein the first data element is subordinate to the second data element in the searchable data structure.

8. The method of claim 7, wherein determining the column heading includes using a natural-language processing model to determine a semantic group represented by structured text of the column.

9. The method of claim 1, wherein the format data specifying the graphical layout of the content items indicates font characteristics for particular text associated with a particular functional region, and wherein the document parsing model assigns a particular category label to the particular functional region based on at least one of the font characteristics of the particular text or a change of the font characteristics between the particular functional region and an adjacent functional region.

10. The method of claim 1, wherein the format data specifying the graphical layout of the content items indicates character spacing in particular text associated with a particular functional region, and wherein the document parsing model assigns a particular category label to the particular functional region based on at least one of the character spacing of the particular text or a change of the character spacing between the particular functional region and an adjacent functional region.

11. The method of claim 1, wherein the format data specifying the graphical layout of the content items indicates a background color associated with a particular functional region, and wherein the document parsing model assigns a particular category label to the particular functional region based on at least one of the background color or a change in background color between the particular functional region and an adjacent functional region.

12. The method of claim 1, wherein the structured text includes one or more special characters, and wherein the document parsing model assigns a particular second category label to a particular second functional region based on a determination that the one or more special characters are present in the particular second functional region.

13. The method of claim 1, wherein the document parsing model is trained to assign a particular first category label to a particular first functional region based on a probabilistic analysis of the pixel data associated with the particular first functional region.

14. The method of claim 1, wherein the document parsing model is trained to assign a particular second category label to a particular second functional region further based on a semantic analysis of text associated with the particular second functional region.

15. The method of claim 1, wherein the searchable data structure has a smaller in-memory footprint than the electronic document.

16. The method of claim 1, further comprising determining a topology of the searchable data structure based on an arrangement of information in the electronic document.

17. The method of claim 1, wherein the document parsing model is trained using labeled training data based on a corpus of electronic documents, each electronic document of the corpus including a plurality of identified functional regions and a respective category label for each of the identified function regions.

18. A system comprising:
a memory storing instructions; and
a processor configured to execute the instructions to perform operations including:
obtaining an electronic document that includes format data specifying a graphical layout of content items, the content items including unstructured text and structured text;
determining pixel data representing the graphical layout of the content items;
providing input data based, at least in part, on the pixel data to a document parsing model that is trained to:
detect, within the graphical layout based on the input data, functional regions, wherein the functional regions include first functional regions corresponding to the unstructured text and second functional regions corresponding to the structured text;
assign, based on the input data, first boundaries to the first functional regions and second boundaries to the second functional regions; and
assign a first category label to each first functional region and a second category label to each second functional region;
matching first portions of the unstructured text to corresponding first category labels of first functional regions based on the first boundaries and locations associated with the unstructured text;
matching second portions of structured text to corresponding second category labels of second functional regions based on the second boundaries and locations associated with the second portions of structured text; and storing each first category label and corresponding first portions of unstructured text and each second category label and corresponding second portions of structured text as document data representing the content items in a searchable data structure, wherein the searchable data structure includes node elements for the first category labels and the second category labels.

19. The system of claim 18, wherein the functional regions include two or more of a page header, a page footer, a section heading, a paragraph, a table, an image, a footnote, or a list.

20. The system of claim 18, wherein, for a particular second functional region labeled as a table, the operations include:
estimating column boundaries and row boundaries based on the input data associated with the particular second functional region;
determining a column heading of a column based on the structured text associated within the particular second functional region;
storing a portion of the structured text associated within the particular second functional region in a first data element of the searchable data structure; and
storing the column heading of the column in a second data element, wherein the first data element is subordinate to the second data element in the searchable data structure.

21. The system of claim 20, wherein determining the column heading includes using a natural-language processing model to determine a semantic group represented by structured text of the column.

22. The system of claim 18, wherein the format data specifying the graphical layout of the content items indicates font characteristics for particular text associated with a particular functional region, and the document parsing model is configured to assign a particular category label to the particular functional region based on at least one of the font characteristics of the particular text or a change of the font characteristics between the particular functional region and an adjacent functional region.

23. The system of claim 18, wherein the format data specifying the graphical layout of the content items indicates character spacing in particular text associated with a particular functional region, and the document parsing model is configured to assign a particular category label to the particular functional region based on at least one of the character spacing of the particular text or a change of the character spacing between the particular functional region and an adjacent functional region.

24. The system of claim 18, wherein the format data specifying the graphical layout of the content items indicates a background color associated with a particular functional region and wherein the document parsing model is configured to assign a particular category label to the particular functional region based on at least one of the background color or a change in background color between the particular functional region and an adjacent functional region.

25. The system of claim 18, wherein the structured text includes one or more special characters and the document parsing model is configured to assign a particular second category label to a particular second functional region based on a determination that the one or more special characters are present in the particular second functional region.

26. The system of claim 18, wherein the document parsing model is trained to assign a particular first category label to a particular first functional region based on probabilistic analysis of the pixel data associated with the particular first functional region.

27. The system of claim 18, wherein the document parsing model is trained to assign a particular second category label to a particular second functional region further based on a semantic analysis of text associated with the particular second functional region.

28. The system of claim 18, wherein the searchable data structure has a smaller in-memory footprint than the electronic document.

29. The system of claim 28, wherein the searchable data structure comprises a tree structure having a plurality of leaf nodes, each leaf node associated with a corresponding branch node, and wherein the content items are assigned to nodes of the tree structure such that a hierarchy of the first functional regions and the second functional regions is represented in the tree structure.

30. The system of claim 18, wherein the operations further comprise determining a topology of the searchable data structure based on an arrangement of information in the electronic document.

31. A non-transitory computer-readable medium storing instructions that are executable by a processor to cause the processor to perform operations comprising:
obtaining an electronic document that includes format data specifying a graphical layout of content items, the content items including unstructured text and structured;
determining pixel data representing the graphical layout of the content items;
providing input data based, at least in part, on the pixel data to a document parsing model that is trained to:
detect, within the graphical layout based on the input data, functional regions, the functional regions including first functional regions corresponding to the unstructured text and second functional regions corresponding to the structured text;
assign, based on the input data, first boundaries to the first functional regions and second boundaries to the second functional regions; and
assign a first category label to each first functional region and a second category label to each second functional region;
matching first portions of the unstructured text to corresponding first category labels of first functional regions based on the first boundaries and locations associated with the first portions of the unstructured text;
matching second portions of structured text to corresponding second category labels of second functional regions based on the second boundaries and locations associated with the second portions of structured text; and
storing each first category label and corresponding first portions of unstructured text and each second category label and corresponding second portions of structured text as document data representing the content items in a searchable data structure, wherein the searchable data structure includes node elements for the first category labels and the second category labels.

* * * * *

UNITED STATES PATENT AND TRADEMARK OFFICE
CERTIFICATE OF CORRECTION

| | |
|---|---|
| PATENT NO. | : 11,727,215 B2 |
| APPLICATION NO. | : 17/099349 |
| DATED | : August 15, 2023 |
| INVENTOR(S) | : Jaidev Amrite, Erik Skiles and Jashmi Lagisetty |

It is certified that error appears in the above-identified patent and that said Letters Patent is hereby corrected as shown below:

In the Claims

Column 28, Line 34, after "tured" delete "at least"
Column 32, Line 33, after "tured" insert --text--

Signed and Sealed this
Seventeenth Day of October, 2023

*Katherine Kelly Vidal*

Katherine Kelly Vidal
*Director of the United States Patent and Trademark Office*